(12) United States Patent
Takeda

(10) Patent No.: US 10,209,421 B2
(45) Date of Patent: Feb. 19, 2019

(54) POLARIZING PLATE, METHOD OF MANUFACTURING THE SAME, AND OPTICAL APPARATUS

(71) Applicant: Dexerials Corporation, Tokyo (JP)

(72) Inventor: Tomu Takeda, Tokyo (JP)

(73) Assignee: Dexerials Corporation, Tokyo (JP)

( * ) Notice: Subject to any disclaimer, the term of this patent is extended or adjusted under 35 U.S.C. 154(b) by 0 days.

(21) Appl. No.: 15/855,937

(22) Filed: Dec. 27, 2017

(65) Prior Publication Data

US 2018/0180786 A1  Jun. 28, 2018

(30) Foreign Application Priority Data

Dec. 28, 2016 (JP) ................... 2016-255934

(51) Int. Cl.
*G02B 5/30* (2006.01)
*G02B 1/18* (2015.01)
*G02B 1/14* (2015.01)

(52) U.S. Cl.
CPC ............ *G02B 5/3058* (2013.01); *G02B 1/14* (2015.01); *G02B 1/18* (2015.01)

(58) Field of Classification Search
CPC ........... G02B 1/14; G02B 1/18; G02B 5/3058
USPC ............ 359/485.05, 487.03, 900; 216/24, 41
See application file for complete search history.

(56) References Cited

U.S. PATENT DOCUMENTS

| | | | | |
|---|---|---|---|---|
| 6,122,103 A | * | 9/2000 | Perkins | ............... G02B 5/3058 359/485.03 |
| 6,156,485 A | * | 12/2000 | Tang | ................... H01L 21/0276 216/41 |
| 6,288,840 B1 | * | 9/2001 | Perkins | ............... G02B 5/3058 359/485.03 |
| 7,957,062 B2 | * | 6/2011 | Takada | ................. G02B 5/3025 349/96 |

(Continued)

FOREIGN PATENT DOCUMENTS

| JP | 2008181113 A | 8/2008 |
|---|---|---|
| JP | 2010210829 A | 9/2010 |

(Continued)

OTHER PUBLICATIONS

Notification of Reasons for Refusal issued in the counterpart Japanese Patent Application No. 2016-255934, dated May 9, 2017 (4 pages).

(Continued)

*Primary Examiner* — Ricky D Shafer
(74) *Attorney, Agent, or Firm* — Osha Liang LLP

(57) ABSTRACT

Provided are a polarizing plate having high transmittance characteristics and excellent controllability of reflectance characteristics, a method of manufacturing the polarizing plate, and an optical apparatus including the polarizing plate. A polarizing plate having a wire grid structure includes a transparent substrate and grid-shaped protrusions that are arranged on the transparent substrate at a pitch shorter than a wavelength of light in a use band and extend in a predetermined direction, the grid-shaped protrusion includes, in order from the transparent substrate side, a pedestal, a reflection layer, a dielectric layer, and an absorption layer, and the pedestal has a trapezoidal shape when viewed from the extending direction of the grid-shaped protrusions.

15 Claims, 13 Drawing Sheets

(56) References Cited

U.S. PATENT DOCUMENTS

| | | | |
|---|---|---|---|
| 8,891,168 B2* | 11/2014 | Minemura | G02B 5/085 |
| | | | 359/485.05 |
| 9,360,608 B2* | 6/2016 | Takahashi | G02B 5/3058 |
| 9,477,024 B2 | 10/2016 | Takahashi et al. | |
| 9,703,026 B2* | 7/2017 | Takada | G02B 5/3058 |
| 9,988,724 B2* | 6/2018 | Takahashi | G02B 5/3058 |
| 2011/0052802 A1* | 3/2011 | Kaida | G02B 5/3058 |
| | | | 427/163.1 |
| 2014/0063467 A1 | 3/2014 | Takahashi et al. | |
| 2016/0054497 A1 | 2/2016 | Takahashi | |
| 2016/0299273 A1* | 10/2016 | Oh | G02B 5/3058 |
| 2018/0081103 A1* | 3/2018 | Takeda | G02B 5/30 |
| 2018/0180785 A1* | 6/2018 | Takeda | G02B 5/3058 |
| 2018/0224589 A1* | 8/2018 | Takada | G02B 5/3058 |

FOREIGN PATENT DOCUMENTS

| | | |
|---|---|---|
| JP | 2014052439 A | 3/2014 |
| JP | 2014186181 A | 10/2014 |
| JP | 2016045345 A | 4/2016 |
| JP | 2016212156 A | 12/2016 |
| WO | 2013046921 A1 | 4/2013 |

OTHER PUBLICATIONS

Decision of Refusal issued in the counterpart Japanese Patent Application No. 2016-255934, dated Sep. 26, 2017 (2 pages).

\* cited by examiner

POLARIZING PLATE, METHOD OF MANUFACTURING THE SAME, AND OPTICAL APPARATUS

This application is based on and claims the benefit of priority from Japanese Patent Application No. 2016-255934, filed on 28 Dec. 2016, the content of which is incorporated herein by reference.

BACKGROUND OF THE INVENTION

Field of the Invention

The present invention relates to a polarizing plate, a method of manufacturing the polarizing plate, and an optical apparatus.

Related Art

In the related art, it is known that, in a wire grid type polarizing plate, in principle, transmittance of light is decreased toward a short wavelength side on the basis of a relationship between a pitch and a grid width (width in an arrangement direction of a grid) according to a wavelength of light in a use band. Particularly, in a visible light region (red band: wavelength $\lambda$=600 to 680 nm, green band: wavelength $\lambda$=520 to 590 nm, and blue band: wavelength $\lambda$=430 to 510 nm) used in a liquid crystal projector, the blue band has the lowest transmittance.

Meanwhile, it is known that the transmittance can be increased by narrowing the grid width of the polarizing plate. However, from the viewpoint of, for example, increasing variations in manufacturing and the like, it is difficult to actually form a pattern where the grid width is narrowed, and it is difficult to maintain reliability as a polarizing plate.

Therefore, the applicant of the present invention has proposed a wire-grid type inorganic polarizing plate including a plurality of linear metal layers, a plurality of linear dielectric layers, and a plurality of linear light absorption layers having a light absorbing function in this order on a transparent substrate, in which a cross-sectional shape of the linear metal layer in a cross section perpendicular to a longitudinal direction of the linear metal layer is a trapezoidal shape having a substrate side as a lower base and a linear dielectric layer side as an upper base, and in which a length of the lower base is longer than a length of the upper base (refer to, for example, Patent Document 1). According to the inorganic polarizing plate disclosed in Patent Document 1, excellent polarization characteristics can be obtained depending on the cross-sectional shape of the linear metal layer.

Patent Document 1: Japanese Unexamined Patent Application, Publication No. 2016-45345

SUMMARY OF THE INVENTION

However, in recent years, a polarizing plate having higher transmittance characteristics and excellent controllability of reflectance characteristics is required. The present invention has been made in view of the above problems, and an object of the present invention is to provide a polarizing plate having high transmittance characteristics and excellent controllability of reflectance characteristics, a method of manufacturing the polarizing plate, and an optical apparatus including the polarizing plate.

In order to achieve the above-described object, according to an aspect of the present invention, there is provided a polarizing plate (for example, a polarizing plate 1 described later) having a wire grid structure, the polarizing plate including: a transparent substrate (for example, a transparent substrate 10 described later); and grid-shaped protrusions (for example, grid-shaped protrusions 11 described later) that are arranged on the transparent substrate at a pitch shorter than a wavelength of light in a use band and extend in a predetermined direction, in which the grid-shaped protrusion includes, in order from the transparent substrate side, a pedestal (for example, a pedestal 12 described later), a reflection layer (for example, a reflection layer 13 described later), a dielectric layer (for example, a dielectric layer 14 described later), and an absorption layer (for example, an absorption layer 15 described later), and the pedestal has a trapezoidal shape when viewed from the predetermined direction.

A minimum width of the pedestal may be equal to or larger than a width of the reflection layer (for example, a width c of the reflection layer described later).

The pedestal may be configured with an Si oxide that is transparent to the wavelength of the light in the use band.

A grid tip (for example, a grid tip 17 described later) formed at a tip of the grid-shaped protrusion may have a tapered shape where a side face is inclined in such a direction that a width thereof is decreased toward a tip side when viewed from the predetermined direction.

The grid tip may be configured with the dielectric layer and the absorption layer, a maximum width (for example, a grid width b described later) of the grid tip may be 35 to 45 nm, and a width of the reflection layer may be 52 to 72% of the maximum width of the grid tip.

When an inclination angle of the side face of the grid tip with respect to the transparent substrate is denoted by $\theta$, a height of the grid tip when viewed from the predetermined direction is denoted by a, a maximum width of the grid tip is denoted by b, and $\theta_0$=arctan(2a/b), 2/3≤a/b≤8/7 may be satisfied, and $\theta_0$≤$\theta$<90° may be satisfied, and the inclination angle $\theta$ may be selected from an angle range in which reflectance of light with a predetermined wavelength in a visible light region in an absorption-axis direction is 10% or less.

The inclination angle $\theta$ may be defined as an inclination angle of a tangent line of the side face of the grid tip at a center position in a height direction of the grid tip when viewed from the predetermined direction, and an angle range thereof may be $\theta$≤80°.

The transparent substrate may be transparent to the wavelength of the light in the use band and may be configured with glass, quartz, or sapphire.

The reflection layer may be configured with aluminum or an aluminum alloy.

The dielectric layer may be configured with an Si oxide.

The absorption layer may be configured to include Fe or Ta and to include Si.

A surface of the polarizing plate on which light is incident may be covered with a protective film made of a dielectric material.

A surface of the polarizing plate on which light is incident may be covered with an organic water-repellent film.

In addition, according to another aspect of the present invention, there is provided a method of manufacturing a polarizing plate having a wire grid structure, the method including: an underlying layer forming step of forming an underlying layer on a transparent substrate; a reflection layer forming step of forming a reflection layer on the underlying layer; a dielectric layer forming step of forming a dielectric layer on the reflection layer; an absorption layer forming step of forming an absorption layer on the dielectric layer; and an etching step of selectively etching a formed stack to form grid-shaped protrusions that are arranged on the transparent substrate at a pitch shorter than a wavelength of light in a use band, in which, in the etching step, the underlying layer is etched to form a pedestal having a trapezoidal shape when viewed from an extending direction of the grid-shaped protrusions.

In addition, according to still another aspect of the present invention, there is provided an optical apparatus including the polarizing plate.

According to the present invention, it is possible to provide a polarizing plate having high transmittance characteristics and excellent controllability of reflectance characteristics, a method of manufacturing the polarizing plate, and an optical apparatus including the polarizing plate.

DETAILED DESCRIPTION OF THE INVENTION

Hereinafter, embodiments of the present invention will be described in detail with reference to the drawings.
[Polarizing Plate]

A polarizing plate according to one embodiment of the present invention is an inorganic polarizing plate having a wire grid structure and includes a transparent substrate and grid-shaped protrusions that are arranged on the transparent substrate at a pitch (period) shorter than a wavelength of light in a use band and extend in a predetermined direction. In addition, the grid-shaped protrusion includes, in order from the transparent substrate side, a pedestal, a reflection layer, a dielectric layer, and an absorption layer.

Figure 1:
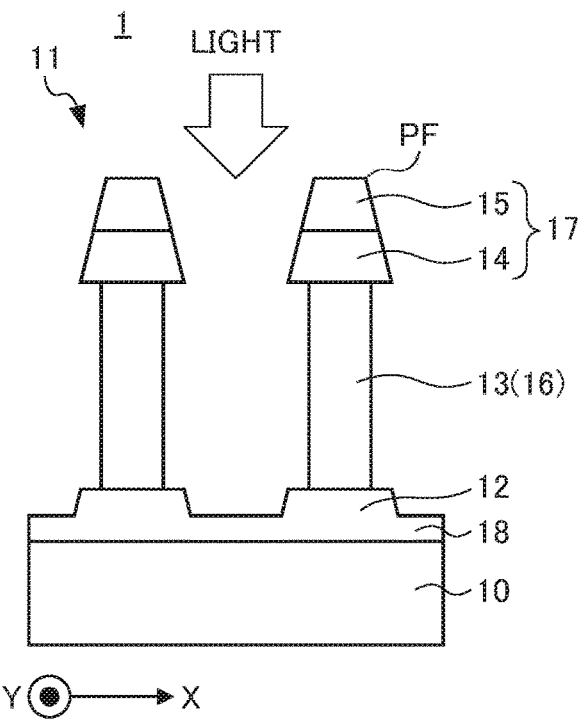
FIG. 1 is a schematic cross-sectional view illustrating a polarizing plate according to one embodiment of the present invention.

FIG. 1 is a schematic cross-sectional view illustrating a polarizing plate 1 according to one embodiment of the present invention. As illustrated in FIG. 1, the polarizing plate 1 includes a transparent substrate 10 transparent to light in a use band and grid-shaped protrusions 11 that are arranged on one surface of the transparent substrate 10 at a pitch shorter than a wavelength of the light in the use band. The grid-shaped protrusion 11 includes, in order from the transparent substrate 10 side, a pedestal 12, a reflection layer 13, a dielectric layer 14, and an absorption layer 15. That is, the polarizing plate 1 has a wire grid structure where the grid-shaped protrusions 11 formed by stacking, in order from the transparent substrate 10 side, the pedestal 12, the reflection layer 13, the dielectric layer 14, and the absorption layer 15 are arranged on the transparent substrate 10 in one-dimensional grid shape.

Herein, as illustrated in FIG. 1, a direction (predetermined direction) in which the grid-shaped protrusion 11 extends is referred to as a Y-axis direction. In addition, a direction perpendicular to the Y-axis direction, in which the grid-shaped protrusions 11 are arranged along the principal surface of the transparent substrate 10, is referred to as an X-axis direction. In this case, the light incident on the polarizing plate 1 is incident on the side of the transparent substrate 10 where the grid-shaped protrusions 11 are formed, preferably in a direction perpendicular to the X-axis direction and the Y-axis direction.

By using the four functions of transmission, reflection, interference, and selective absorption of a polarized wave due to optical anisotropy, the polarizing plate 1 attenuates a polarized wave (TE wave (S wave)) having an electric field component parallel to the Y-axis direction and transmits a polarized wave (TM wave (P wave)) having an electric field component parallel to the X-axis direction. Therefore, the Y-axis direction is the direction of the absorption axis of the polarizing plate 1, and the X-axis direction is the direction of the transmission axis of the polarizing plate 1.

A portion of the light incident from the side of the polarizing plate 1 on which the grid-shaped protrusions 11 are formed is absorbed and attenuated when the light passes through the absorption layer 15 and the dielectric layer 14. In the light transmitted through the absorption layer 15 and the dielectric layer 14, a polarized wave (TM wave (P wave)) passes through the reflection layer 13 with high transmittance. On the other hand, in the light transmitted through the absorption layer 15 and the dielectric layer 14, a polarized wave (TE wave (S wave)) is reflected by the reflection layer 13. When the TE wave passes through the absorption layer 15 and the dielectric layer 14, a portion of the TE wave reflected by the reflection layer 13 is absorbed, and another portion of the TE wave is reflected and returned to the reflection layer 13. In addition, when the TE wave passes through the absorption layer 15 and the dielectric layer 14, the TE wave reflected by the reflection layer 13 is attenuated due to interference. In this manner, the polarizing plate 1 can obtain desired polarization characteristics by performing selective attenuation of the TE wave.

As illustrated in FIG. 1, when viewed from a direction (predetermined direction) in which one-dimensional grid extends, that is, when a cross-section thereof perpendicular to the predetermined direction is viewed, the grid-shaped protrusion 11 includes a pedestal 12 having a trapezoidal shape, a grid leg 16 having a rectangular shape, and a grid tip 17 having a tapered shape. The grid legs 16 are formed to extend vertically from the pedestal 12. The grid leg 16 is configured with a reflection layer 13. That is, the boundary between the grid leg 16 and the grid tip 17 is located at the boundary between the reflection layer 13 and the dielectric layer 14. The grid tip 17 has a tapered shape where the side face thereof is inclined in such a direction that the width thereof is decreased toward the tip side (side opposite to the transparent substrate 10) when viewed from a predetermined direction. More specifically, the grid tip 17 according to this embodiment has an isosceles trapezoidal shape. The grid tip 17 is configured with a dielectric layer 14 and an absorption layer 15.

By allowing the grid tip 17 to have a tapered shape, the transmittance of the TM wave can be increased. It is considered that the reason why the transmittance of the TM wave is increased in this manner is that the grid tip 17 has a tapered shape, so that an effect of suppressing scattering of the light incident with variation in angle is obtained.

Figure 2:
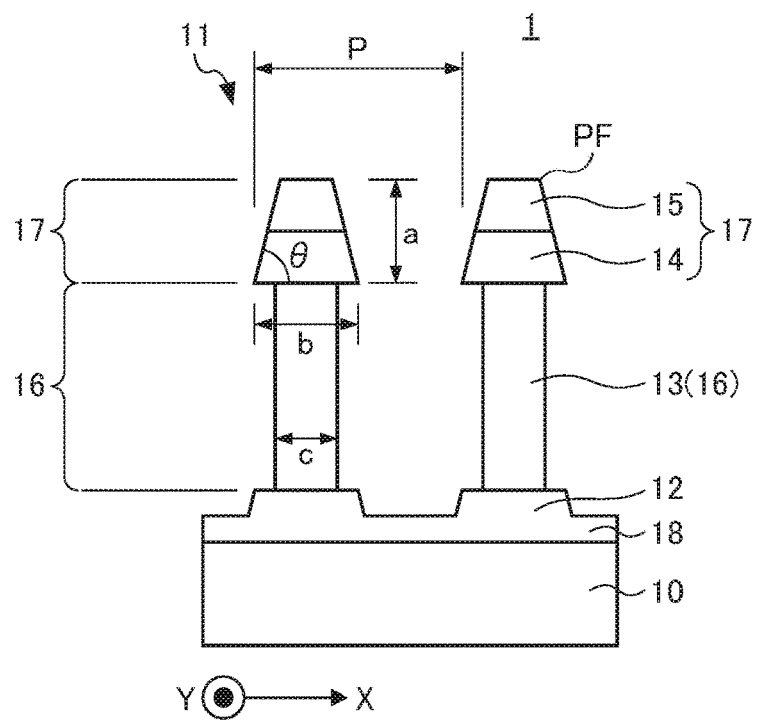
FIG. 2 is a schematic cross-sectional view illustrating shape parameters of the polarizing plate according to the embodiment.

Herein, FIG. 2 is a schematic cross-sectional view illustrating shape parameters of the polarizing plate 1 according to this embodiment. In the following description, the height denotes the dimension in the direction perpendicular to the principal surface of the transparent substrate 10, and the width denotes the dimension in the X-axis direction perpendicular to the height direction when viewed from the Y-axis direction along the extending direction of the grid-shaped protrusion 11. In addition, when the polarizing plate 1 is viewed from the Y-axis direction along the extending direction of the grid-shaped protrusion 11, the repetition interval in the X-axis direction of the grid-shaped protrusions 11 is referred to as the pitch P.

The pitch P of the grid-shaped protrusions 11 is not particularly limited as long as the pitch is shorter than the wavelength of the light in the use band. From the viewpoints of facilitation of manufacturing and stability, the pitch P of the grid-shaped protrusions 11 is preferably, for example, 100 nm to 200 nm. The pitch P of the grid-shaped protrusions 11 can be measured by observation with a scanning electron microscope or a transmission electron microscope. For example, the pitch P can be measured at arbitrary four places by using the scanning electron microscope or the transmission electron microscope, and the arithmetic average value thereof can be taken as the pitch P of the grid-shaped protrusions 11. Hereinafter, this measurement method is referred to as an electron microscopy method.

In addition, the maximum width in the X-axis direction of the grid tip 17 of the grid-shaped protrusion 11 is referred to as a grid width b. In this embodiment, the grid width b denotes the width of the end portion on the reflection layer 13 side of the grid tip 17. Specifically, the grid width b is preferably 35 to 45 nm. In addition, these widths can be measured by, for example, the above-described electron microscopy method.

Figure 3:
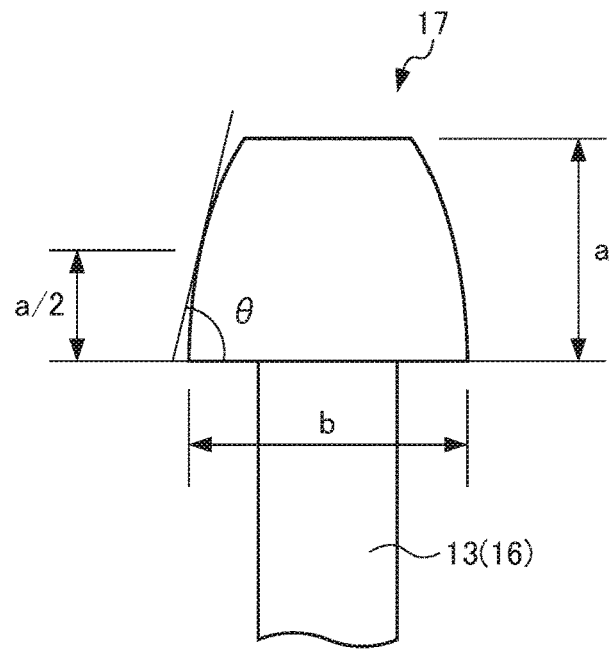
FIG. 3 is a schematic cross-sectional view illustrating an inclination angle of a grid tip of the polarizing plate according to the embodiment.

In addition, the inclination angle of the side face of the grid tip 17 with respect to the transparent substrate 10 is referred to as an inclination angle θ, and the height of the grid tip 17 is referred to as a height a. However, since the grid-shaped protrusion 11 has an extremely fine structure, the shape of the grid tip 17 is practically, for example, rounded to some extent as illustrated in FIG. 3. Therefore, the inclination angle θ is defined as the inclination angle of the side face of the grid tip 17 with respect to the transparent substrate 10 at the center position of the height a of the grid tip 17, that is, the position of the height a/2. At this time, the specific range of the inclination angle θ is preferably θ≤80°. The inclination angle θ and the height a can be measured by, for example, the above-described electron microscopy method.

In addition, when $\theta_0=\arctan(2a/b)$, the polarizing plate 1 according to this embodiment satisfies 2/3≤a/b≤8/7 and preferably satisfies $\theta_0$≤θ<90°. At this time, the inclination angle θ is preferably selected from the angle range that allows the reflectance of light with a predetermined wavelength in the visible light region in the direction of the absorption axis to be 10% or less.

The transparent substrate 10 is not particularly limited as long as the transparent substrate is a substrate exhibiting transparency with respect to the light in the use band, and the transparent substrate can be appropriately selected according to the purpose. The phrase "exhibiting transparency with respect to the light in the use band" does not denote that the transmittance of the light in the use band is 100% but does denote exhibiting transparency capable of retaining the function as the polarizing plate. As the light in the use band, visible light with a wavelength of about 380 nm to 810 nm may be exemplified.

The shape of the principal surface of the transparent substrate 10 is not particularly limited, and a shape (for example, a rectangular shape) according to the purpose is appropriately selected. The average thickness of the transparent substrate 10 is preferably, for example, 0.3 mm to 1 mm.

As a constituent material of the transparent substrate 10, a material having a refractive index of 1.1 to 2.2 is preferred, and glass, quartz, sapphire, and the like may be exemplified. From the viewpoint of cost and light transmittance, it is preferable to use glass, particularly, quartz glass (refractive index 1.46) or soda lime glass (refractive index 1.51). The component composition of the glass material is not particularly limited, and for example, an inexpensive glass material such as silicate glass widely distributed as optical glass can be used.

In addition, from the viewpoint of thermal conductivity, it is preferable to use quartz or sapphire having high thermal conductivity. Accordingly, it is possible to obtain high light resistance to strong light, and thus, the transparent substrate is preferably used as a polarizing plate for an optical engine of a projector with a large amount of heat generation.

In addition, in a case where the transparent substrate made of an optically active crystal such as quartz crystal is used, it is preferable to arrange the grid-shaped protrusions 11 in a direction parallel or perpendicular to the optical axis of the crystal. Accordingly, excellent optical characteristics can be obtained. Herein, the optical axis is the direction axis in which the difference in refractive index between O (ordinary ray) and E (extraordinary ray) of light traveling in the direction is minimized.

As illustrated in FIG. 1, the pedestal 12 has a trapezoidal shape when viewed from a direction in which each one-dimensional grid extends (predetermined direction), that is, when a cross-section thereof perpendicular to the predetermined direction is viewed. More specifically, the pedestal 12 according to this embodiment has an isosceles trapezoidal shape where the side surface thereof is inclined so that the width thereof is decreased from the transparent substrate 10 side toward the reflection layer 13 side when viewed from the predetermined direction.

The minimum width of the pedestal 12 is preferably equal to or larger than the width of the reflection layer 13. That is, the width of the end portion of the pedestal 12 having the minimum width on the reflection layer 13 side is equal to or larger than the width of the reflection layer 13. More preferably, the minimum width of the pedestal 12 is set to be larger than the width of the reflection layer 13. In addition, these widths can be measured by, for example, the above-described electron microscopy method.

The film thickness of the pedestal 12 is not particularly limited and is preferably, for example, 10 nm to 100 nm. The film thickness of the pedestal 12 can be measured by, for example, the above-described electron microscopy method.

The pedestal 12 is formed by arranging the dielectric film extending in the Y-axis direction which is an absorption axis on the transparent substrate 10. As a constituent material of the pedestal 12, a material that is transparent to the light in the use band and has a refractive index lower than that of the transparent substrate 10 is preferred, and among the materials, an Si oxide such as $SiO_2$ is preferred.

The pedestal 12 can be formed, for example, by step-by-step changing the balance between the isotropic etching by dry etching and the anisotropic etching with respect to the underlying layer 18 made of the above-described dielectric formed on the transparent substrate 10. In this case, as illustrated in FIG. 1, the pedestal 12 is arranged on the underlying layer 18 formed on the transparent substrate 10. It is considered that, by forming the pedestal 12 in a trapezoidal shape, the same effect as the moth eye structure where the refractive index is gently changed can be obtained, reflection of light can be prevented, and high transmittance characteristics can be obtained.

The reflection layer 13 is formed on the pedestal 12, and a metal film extending in a band shape in the Y-axis direction which is an absorption axis is arranged. More specifically, the reflection layer 13 extends vertically from the pedestal 12 and has a rectangular shape when viewed from the predetermined direction, that is, when the cross-section thereof perpendicular to the predetermined direction is viewed. The reflection layer 13 has a function as a wire grid type polarizer to attenuate a polarized wave (TE wave (S wave)) having an electric field component in a direction parallel to the longitudinal direction of the reflection layer 13 and to transmit a polarized wave (TM wave (P wave)) having an electric field component in a direction perpendicular to the longitudinal direction of the reflection layer 13.

As a constituent material of the reflection layer 13, there is no particular limitation as long as the material is reflective to the light in the use band, and a single-element substance such as Al, Ag, Cu, Mo, Cr, Ti, Ni, W, Fe, Si, Ge, or Te or an alloy containing one or more of the aforementioned elements may be exemplified. Among the aforementioned constituent materials, the reflection layer 13 is preferably configured with aluminum or an aluminum alloy. In addition to the aforementioned metal materials, the reflection layer 13 may be configured with an inorganic film or a resin film other than a metal formed with a high surface reflectance by, for example, coloring or the like.

The film thickness of the reflection layer 13 is not particularly limited and is preferably, for example, 100 nm to 300 nm. In addition, the film thickness of the reflection layer 13 can be measured by, for example, the above-described electron microscopy method.

The width c of the reflection layer 13 is set to be preferably equal to or smaller than the minimum width of the pedestal 12, more preferably smaller than the minimum width of the pedestal 12. In addition, as described later, the width c of the reflection layer 13 is preferably smaller than the maximum width of the dielectric layer 14, that is, the grid width b which is the maximum width of the grid tip 17. Specifically, the ratio of the width c of the reflection layer 13 to the grid width b is preferably 52 to 72%. In addition, the width can be measured by, for example, the above-described electron microscopy method.

As a method of forming the width of the reflection layer 13 to be smaller than the width of the pedestal 12 or the grid width (width of the dielectric layer 14) b, isotropic etching by wet etching may be exemplified. As described above, although the reflection layer 13 reflects light, the area of the reflection layer 13 when viewed from the incident direction of the light is changed by controlling the width of the reflection layer 13, and thus, an amount of the light reflected by the reflection layer 13 is changed. Therefore, by controlling the ratio of the width of the reflection layer 13 to the grid width b, the light transmission characteristics of the polarizing plate 1 can be controlled.

The dielectric layer 14 is formed on the reflection layer 13, and the dielectric film extending in a band shape in the Y-axis direction which is an absorption axis is arranged. The dielectric layer 14 is formed with a film thickness so that, in the polarized light reflected by the absorption layer 15, the phase of the polarized light transmitted through the absorption layer 15 and reflected by the reflection layer 13 is shifted by a half wavelength. Specifically, the film thickness of the dielectric layer 14 is appropriately set to be within a range of 1 to 500 nm, which can improve the interference effect by adjusting the phase of polarized light. The film thickness of the dielectric layer 14 can be measured by, for example, the above-described electron microscopy method.

As the constituent material of the dielectric layer 14, general materials like an Si oxide such as $SiO_2$, a metal oxide such as $Al_2O_3$, a beryllium oxide, and a bismuth oxide, $MgF_2$, cryolite, germanium, titanium dioxide, silicon, a magnesium fluoride, a boron nitride, a boron oxide, a tantalum oxide, carbon, or a combination thereof may be exemplified. Among the aforementioned materials, the dielectric layer 14 is preferably configured with an Si oxide.

The refractive index of the dielectric layer 14 is preferably larger than 1.0 and equal to or smaller than 2.5. Since the optical characteristics of the reflection layer 13 are also affected by the refractive indexes of the surroundings, it is possible to control the characteristics of the polarizing plate by selecting the material of the dielectric layer 14. In addition, by properly adjusting the film thickness and the refractive index of the dielectric layer 14, it is possible to reflect a portion of the TE wave reflected by the reflection layer 13 back to the reflection layer 13 when passing through the absorption layer 15, and thus, it is possible to attenuate the light passing through the absorption layer 15 by interference. In this manner, by performing selective attenuation of the TE wave, it is possible to obtain desired polarization characteristics.

The absorption layer 15 is formed on the dielectric layer 14 and is arranged to extend in a band shape in the Y-axis direction which is an absorption axis. As the constituent materials of the absorption layer 15, one or more substances having a light absorbing function, where an extinction constant of an optical constant of a metal material, a semiconductor material, or the like is not zero, may be exemplified, and the substance is properly selected according to the wavelength range of light to be applied. As the metal material, a single-element substance such as Ta, Al, Ag, Cu, Au, Mo, Cr, Ti, W, Ni, Fe, or Sn or an alloy containing one or more of the aforementioned elements may be exemplified. In addition, as the semiconductor material, Si, Ge, Te, ZnO, silicide materials ($\beta$-$FeSi_2$, $MgSi_2$, $NiSi_2$, $BaSi_2$, $CrSi_2$, $CoSi_2$, TaSi, or the like) may be exemplified. By using the materials, the polarizing plate 1 can obtain a high extinction ratio with respect to the visible light range to be applied. Particularly, the absorption layer 15 is preferably configured to include Fe or Ta and to include Si.

In a case where a semiconductor material is used as the absorption layer 15, since the band gap energy of the semiconductor is involved in the absorption function, it is necessary that the band gap energy is equal to or lower than the use band. For example, in a case where the material is used in visible light, it is necessary to use a material having absorption at a wavelength of 400 nm or more, that is, a material having a band gap of 3.1 eV or less.

The film thickness of the absorption layer 15 is not particularly limited and is preferably, for example, 10 nm to 100 nm. The film thickness of the absorption layer 15 can be measured by, for example, the above-described electron microscopy method. In addition, the absorption layer 15 can be formed as a high-density film by a vapor deposition method or a sputtering method. In addition, the absorption layer 15 may be configured with two or more layers having different constituent materials.

The polarizing plate 1 according to this embodiment having the above-described structure may include a diffusion barrier layer between the dielectric layer 14 and the absorption layer 15. That is, in this case, the grid-shaped protrusion 11 includes, in order from the transparent substrate 10 side, the pedestal 12, the reflection layer 13, the dielectric layer 14, the diffusion barrier layer, and the absorption layer 15. The diffusion barrier layer is included, so that diffusion of light in the absorption layer 15 is prevented. This diffusion barrier layer is configured with a metal film of Ta, W, Nb, Ti, or the like.

In addition, in the polarizing plate 1 according to this embodiment, the surface on the light incidence side may be covered with a protective film (denoted hereinafter with the reference characters "PF") made of a dielectric within such a range that the change in optical characteristics is not affected. Specifically, it is preferable that at least the side face (inclined surface) of the grid tip 17 is covered with a protective film PF. The protective film PF is configured with a dielectric film and can be formed, for example, on the surface (surface on which the wire grid is formed) of the polarizing plate 1 by using chemical vapor deposition (CVD) or atomic layer deposition (ALD). Therefore, it is possible to suppress the oxidation reaction more than is necessary for the metal film.

Furthermore, in the polarizing plate 1 according to this embodiment, the surface on the light incidence side may be covered with an organic water-repellent film. Specifically, it is preferable that at least the side face (inclined surface) of the grid tip 17 is covered with the organic water-repellent film. The organic water-repellent film is configured with, for example, a fluorine-based silane compound such as perfluorodecyltriethoxysilane (FDTS) and can be formed by using, for example, the above-described CVD or ALD. Therefore, the reliability such as moisture resistance of the polarizing plate 1 can be improved.

[Method of Manufacturing Polarizing Plate]

The method of manufacturing the polarizing plate 1 according to this embodiment includes an underlying layer forming step, a reflection layer forming step, a dielectric layer forming step, an absorption layer forming step, and an etching step.

In the underlying layer forming step, an underlying layer is formed on a transparent substrate 10. In the reflection layer forming step, a reflection layer is formed on the underlying layer formed in the underlying layer forming step. In the dielectric layer forming step, a dielectric layer is formed on the reflection layer formed in the reflection layer forming step. In the absorption layer forming step, an absorption layer is formed on the dielectric layer formed in the dielectric layer forming step. In each of the layer forming steps, each layer can be formed by, for example, a vapor deposition method or a sputtering method.

In the etching step, by selectively etching the stack formed through the above-described layer forming steps, grid-shaped protrusions 11 arranged on the transparent substrate 10 at a pitch shorter than a wavelength of light in a use band are formed. Specifically, a one-dimensional grid-shaped mask pattern is formed by, for example, photolithography or nanoimprinting. Then, the stack is selectively etched to form the grid-shaped protrusions 11 arranged on the transparent substrate 10 at a pitch shorter than the wavelength of the light in the use band. As an etching method, a dry etching method using an etching gas corresponding to an etching object may be exemplified.

Particularly, in this embodiment, by optimizing the etching conditions (gas flow rate, gas pressure, power, and cooling temperature of the transparent substrate), a tapered shape is formed where the side face of the grid tip 17 is inclined. In addition, by optimizing the etching conditions, the underlying layer 18 is etched to form the pedestal 12 having a trapezoidal shape when viewed from the extending direction of the grid-shaped protrusion 11.

In addition, the method of manufacturing the polarizing plate 1 according to this embodiment may include a step of covering at least the side face (inclined surface) of the grid tip 17 with a protective film PF. In addition, the method of manufacturing the polarizing plate 1 according to this embodiment may further include a step of covering at least the side face (inclined surface) of the grid tip 17 with an organic water-repellent film. In this manner, the polarizing plate 1 according to this embodiment is manufactured.

[Optical Apparatus]

The optical apparatus according to this embodiment includes the polarizing plate 1 according to this embodiment described above. As the optical apparatus, a liquid crystal projector, a head-up display, a digital camera, and the like may be exemplified. Since the polarizing plate 1 according to this embodiment is an inorganic polarizing plate excellent in heat resistance as compared with an organic polarizing plate, the polarizing plate according to this embodiment is suitable for applications such as a liquid crystal projector, a head-up display, and the like, which are required to have heat resistance.

In a case where the optical apparatus according to this embodiment includes a plurality of polarizing plates, at least one of the plurality of polarizing plates may be the polarizing plate 1 according to this embodiment. For example, in a case where the optical apparatus according to this embodiment is a liquid crystal projector, at least one of the polarizing plates arranged on the incident side and the emission side of a liquid crystal panel may be the polarizing plate 1 according to this embodiment.

According to the polarizing plate 1, the method of manufacturing the polarizing plate, and the optical apparatus described above, the following effects are obtained.

The polarizing plate 1 according to this embodiment has a wire grid structure where grid-shaped protrusions 11 including, in order from a transparent substrate 10 side, a pedestal 12, a reflection layer 13, a dielectric layer 14, and an absorption layer 15 are arranged, and in the polarizing plate 1, by forming the pedestal 12 in a trapezoidal shape, the same effect as the moth eye structure where the refractive index in the pedestal 12 is gently changed can be obtained. For this reason, it is considered that reflection of light can be further prevented and high transmittance characteristics can be obtained. Therefore, according to this embodiment, it is possible to provide a polarizing plate 1 having high transmittance characteristics and excellent controllability of reflectance characteristics, a method of manufacturing the polarizing plate, and an optical apparatus including the polarizing plate 1.

In addition, the present invention is not limited to the above-described embodiment, and modifications and improvements within the range where the object of the present invention can be achieved are included in the present invention.

Figure 4:
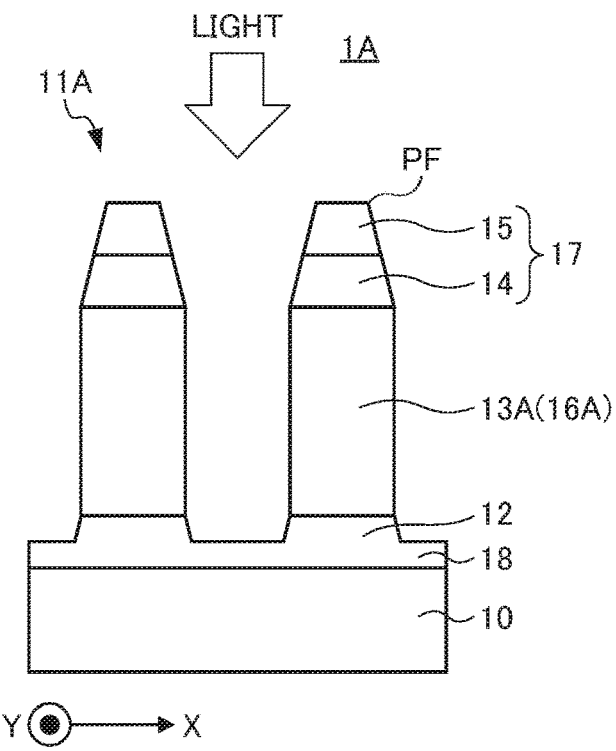
FIG. 4 is a schematic cross-sectional view illustrating a polarizing plate according to Modified Example 1 of the embodiment.

FIG. 4 is a schematic cross-sectional view illustrating a polarizing plate 1A according to Modified Example 1 of this embodiment. The configuration of a grid-shaped protrusion 11A of the polarizing plate 1A is the same as that of the above-described embodiment, except that the width of a reflection layer 13A constituting a grid leg 16A is equal to the maximum width (grid width) of a dielectric layer 14 constituting the grid tip 17. In addition, in the polarizing plate 1A, the width of the reflection layer 13A is equal to the minimum width of a pedestal 12.

According to the polarizing plate 1A, by forming the pedestal 12 in a trapezoidal shape as in the above-described embodiment, the same effect as the moth eye structure where the refractive index is gently changed in the pedestal 12 can be obtained. For this reason, it is considered that reflection of light can be further prevented and high transmittance characteristics can be obtained. Therefore, according to the polarizing plate 1A according to Modified Example 1, it is possible to provide a polarizing plate 1A having high transmittance characteristics and excellent controllability of reflectance characteristics, a method of manufacturing the polarizing plate, and an optical apparatus including the polarizing plate 1A.

In addition, in the above-described embodiment, the boundary between the grid tip and the grid leg is the boundary between the reflection layer and the dielectric layer, and the grid tip includes the dielectric layer and the absorption layer. However, the present invention is not limited thereto. The grid tip may be configured with an absorption layer and a dielectric layer including a reflection layer or may be configured with only an absorption layer. However, by including the reflection layer at the grid tip, the transmittance of the TM wave transmitted through the polarizing plate can be further improved. In addition, the applications of the polarizing plate according to this embodiment are not limited to liquid crystal projectors. The polarizing plate according to this embodiment can be used for various applications as a polarizing plate with a high transmittance power of polarized light in the transmission axis direction.

EXAMPLES

Next, examples of the present invention will be described, but the present invention is not limited to these examples.

Examples 1 and 2

In Example 1, the polarizing plate 1 having the structure illustrated in FIG. 1 was used for simulation. In addition, in Example 2, the polarizing plate 1A having the structure illustrated in FIG. 4 was used for simulation. More specifically, the optical characteristics of these polarizing plates were verified by electromagnetic field simulation in accordance with a rigorous coupled wave analysis (RCWA) method. For the simulation, a grating simulator Gsolver produced by Grating Solver Development was used. In addition, the simulation of other Examples described below is the same.

Figure 5:
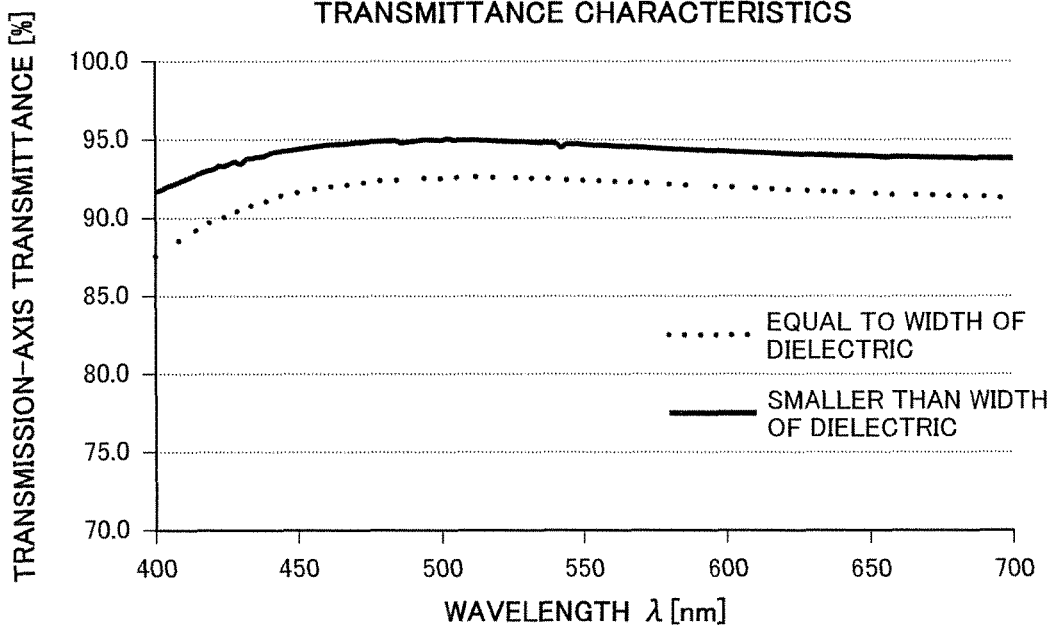
FIG. 5 is a graph illustrating results of simulation verification of the transmission-axis transmittance Tp of the polarizing plate having the structure illustrated in FIG. 1 and the polarizing plate having the structure illustrated in FIG. 4.

FIG. 5 is a graph illustrating results of simulation verification of the transmission-axis transmittance Tp of the polarizing plate 1 having the structure illustrated in FIG. 1 and the polarizing plate 1A having the structure illustrated in FIG. 4. In FIG. 5, the horizontal axis represents the wavelength $\lambda$ (nm), and the vertical axis represents the transmission-axis transmittance Tp (%). Herein, the transmission-axis transmittance Tp denotes the transmittance of polarized light (TM wave) in the transmission axis direction (X-axis direction) incident on the polarizing plate. In addition, in FIG. 5, the polarizing plate where the width of the reflection layer illustrated by a solid line is smaller than the width of the dielectric layer indicates the polarizing plate 1 of FIG. 1, and the polarizing plate where the width of the reflection layer illustrated by a broken line is equal to the width of the dielectric layer indicates the polarizing plate 1A of FIG. 4.

As illustrated in FIG. 5, it was confirmed that both the polarizing plate 1 having the structure illustrated in FIG. 1 and the polarizing plate 1A having the structure illustrated in FIG. 4 can obtain high transmission-axis transmittance. In addition, it was confirmed that, by allowing the width of the reflection layer to be smaller (narrower) than the width of the dielectric layer, the transmission-axis transmittance Tp was improved in the entire visible light region of from the light in the blue band ($\lambda$=430 to 510 nm) to the light in the red band ($\lambda$=600 to 680 nm).

Example 3

In Example 3, the polarizing plate 1 having the structure illustrated in FIG. 1, of which the grid width was changed to 35 nm, 40 nm, 45 nm, 50 nm, and 55 nm and of which the ratio of the width of the reflection layer to the grid width was changed was used for simulation. More specifically, simulation was performed for light in the green band (wavelength $\lambda$=520 to 590 nm) of incident light.

Figure 6:
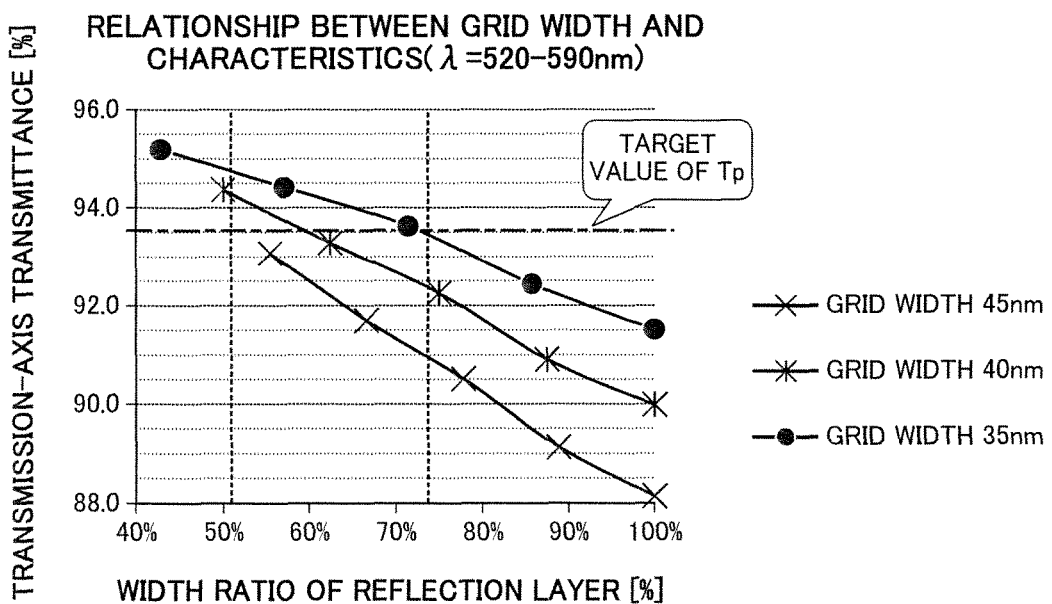
FIG. 6 is a graph illustrating results of simulation verification of the relationship between the width of the reflection layer of the polarizing plate having the structure illustrated in FIG. 1 and the transmission-axis transmittance Tp.
Figure 7:
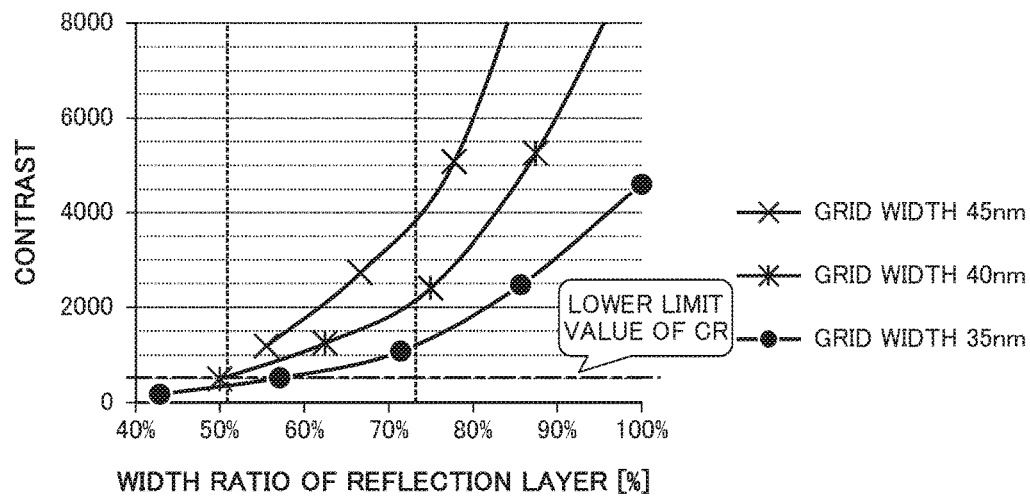
FIG. 7 is a graph illustrating results of simulation verification of the relationship between the width of the reflection layer of the polarizing plate having the structure illustrated in FIG. 1 and the contrast CR.

FIG. 6 is a graph illustrating results of simulation verification of the relationship between the width of the reflection layer of the polarizing plate 1 having the structure illustrated in FIG. 1 and the transmission-axis transmittance Tp. More specifically, FIG. 6 illustrates the relationship between the ratio of the width of the reflection layer to the grid width and the transmission-axis transmittance Tp. The horizontal axis represents the width ratio (%) of the reflection layer, and the vertical axis represents the transmission-axis transmittance Tp (%). In addition, FIG. 7 is a graph illustrating results of simulation verification of the relationship between the width of the reflection layer of the polarizing plate 1 having the structure illustrated in FIG. 1 and the contrast CR. More specifically, the relationship between the ratio of the width of the reflection layer to the grid width and the contrast CR is illustrated. The horizontal axis represents the width ratio (%) of the reflection layer, and the vertical axis represents the contrast CR. Herein, the contrast CR denotes the ratio (transmission-axis transmittance Tp/absorption-axis transmittance Ts) of the transmission-axis transmittance Tp to the absorption-axis transmittance Ts. The absorption-axis transmittance Ts denotes the transmittance of polarized light (TE wave) in the absorption axis direction (Y-axis direction) incident on the polarizing plate.

As illustrated in FIG. 6, it can be understood that the transmission-axis transmittance Tp is increased as the grid width is decreased. In addition, it can be understood that, if the grid width is the same, the transmission-axis transmittance Tp is increased as the ratio of the width of the reflection layer to the grid width is decreased. For example, by comparing a case where the grid width is 35 nm and the ratio of the width of the reflection layer to the grid width is 100% with a case where the grid width is 45 nm and the ratio of the width of the reflection layer to the grid width is about 67%, almost the same transmission-axis transmittance Tp is obtained.

As described above, it is difficult to narrow the grid width from the viewpoint of variations in manufacturing, and it is also difficult to maintain reliability as a polarizing plate by narrowing the grid width. Meanwhile, according to this example, by controlling the ratio of the width of the reflection layer to the grid width, the transmission-axis transmittance Tp corresponding to the grid width smaller than the actual grid width can be obtained. Therefore, according to this example, since it is not always necessary to narrow the grid width in accordance with the desired light transmission characteristics, it is possible to suppress variations in manufacturing and to improve reliability.

In addition, as illustrated in FIG. 7, it can be understood that the contrast CR is also changed according to the change in the ratio of the width of the reflection layer to the grid width (increase in the transmission-axis transmittance Tp) in any grid width. Accordingly, it can be understood that the transmittance characteristics of the polarizing plate can be improved and an arbitrary contrast CR can be obtained.

As described above, there is a projector application as one of applications of the polarizing plate. In a case where the polarizing plate is used for a projector, since higher transmission-axis transmittance and higher contrast are required in recent years, it is preferable that the transmission-axis transmittance Tp is 93.5% or more (refer to the target value of Tp in FIG. 6), and it is preferable that the contrast CR is larger than 500 (refer to the target value of CR in FIG. 7).

Herein, for each grid width, the ratio of the width of the reflection layer to the grid width when the transmission-axis transmittance Tp is 93.5% or more and the ratio of the width of the reflection layer to the grid width when the contrast is 500 are listed in Table 1.

TABLE 1

| Width ratio of reflection layer | | Grid width [nm] | | | |
|---|---|---|---|---|---|
| | | 35 | 40 | 45 | 50 | 55 |
| Transmission-axis transmittance Tp[%] | 88.0 | — | — | — | 82.70% | 68.70% |
| | 88.5 | — | — | 96.00% | 79.00% | 66.10% |
| | 89.0 | — | — | 91.10% | 75.40% | 63.50% |
| | 89.5 | — | — | 86.30% | 71.80% | 61.10% |
| | 90.0 | — | 99.10% | 81.70% | 68.30% | 58.80% |
| | 90.5 | — | 93.50% | 77.10% | 65.00% | 56.50% |

TABLE 1-continued

| Width ratio of reflection layer | Grid width [nm] | | | | |
|---|---|---|---|---|---|
| | | 35 | 40 | 45 | 50 | 55 |
| | 91.0 | — | 88.00% | 72.70% | 61.60% | 54.30% |
| | 91.5 | 99.30% | 82.40% | 68.40% | 58.40% | 52.20% |
| | 92.0 | 93.20% | 76.80% | 64.20% | 55.30% | 50.20% |
| | 92.5 | 86.60% | 71.20% | 60.10% | 52.20% | 48.30% |
| | 93.0 | 79.60% | 65.60% | 56.10% | 49.20% | 46.50% |
| | 93.5 | 72.00% | 60.00% | 52.20% | 46.30% | 44.80% |
| | 94.0 | 64.00% | 54.30% | 48.50% | 43.40% | 43.10% |
| Contrast CR | 500 | 56.70% | 50.20% | 49.40% | 51.20% | 54.00% |

As illustrated in Table 1, in a case where the grid width is 45 nm, the ratio of the width of the reflection layer to the grid width when the contrast CR is 500 is smallest. Therefore, it can be said that, in order to allow the contrast CR to be larger than 500, it is preferable that the ratio of the width of the reflection layer to the grid width is approximately 50% or more.

A case where the transmission-axis transmittance Tp is 93.5% or more corresponds to a case where, when the grid width is 35 nm, the ratio of the width of the reflection layer to the grid width is 72.0% or less. Similarly, in a case where the grid width is 40 nm, the ratio of the width of the reflection layer to the grid width is 60.0% or less, and in a case where the grid width is 45 nm, the ratio of the width of the reflection layer to the grid width is 52.2% or less. Therefore, in order to allow the transmission-axis transmittance Tp to be 93.5% or more, the grid width is in a range of 35 nm to 45 nm, and when the ratio of the width of the reflection layer to the grid width is X %, it can be said that a preferable range of X % is 52% to 72%.

In addition, in this example, simulation was performed on light in the green band (wavelength λ=520 to 590 nm) as incident light. However, even when the incident light is light in the red band (wavelength λ=600 to 680 nm) or light in the blue band (λ=430 to 510 nm), the same result is obtained although the ratio X % of the width of the reflection layer to the grid width is slightly larger and smaller.

Comparative Example 1

Figure 8:
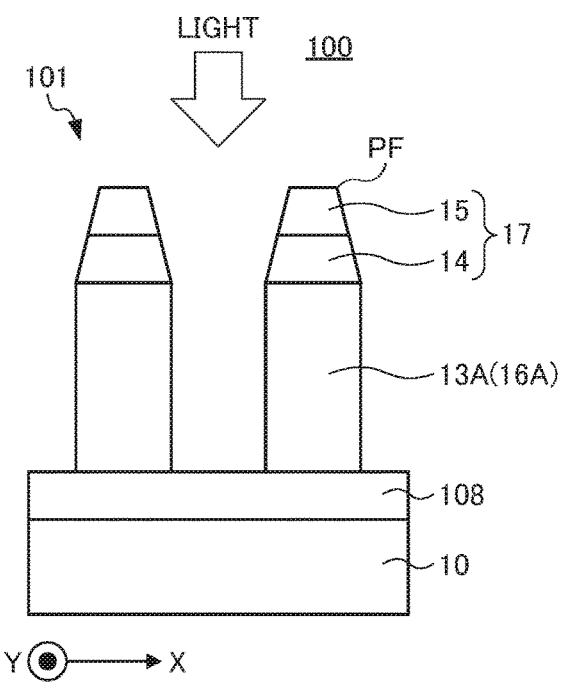
FIG. 8 is a schematic cross-sectional view illustrating a polarizing plate having no pedestal.

FIG. 8 is a schematic cross-sectional view illustrating a polarizing plate 100 having no pedestal. The polarizing plate 100 has the same configuration as that of the polarizing plate 1A having the structure illustrated in FIG. 4, except that the grid-shaped protrusion 101 has no pedestal and is directly provided on the underlying layer 108. In FIG. 8, the components common to the polarizing plate 1 are denoted by the same reference numerals. The polarizing plate 100 having the structure illustrated in FIG. 8 was used for simulation.

Figure 9:
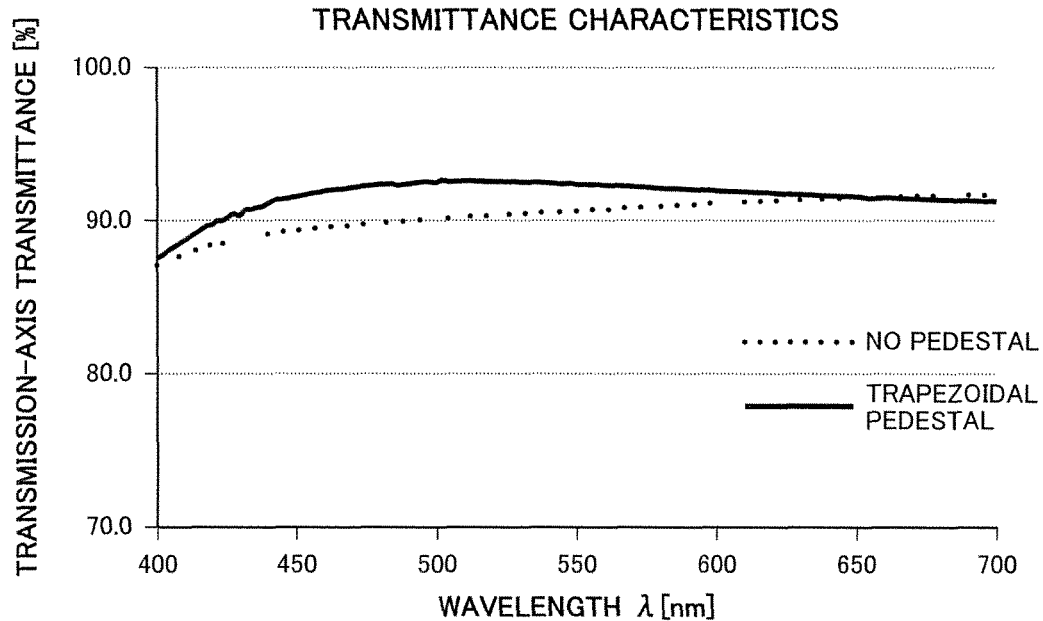
FIG. 9 is a graph illustrating results of simulation verification of the transmission-axis transmittance Tp of the polarizing plate having the structure illustrated in FIG. 4 and the polarizing plate having the structure illustrated in FIG. 8.

FIG. 9 is a graph illustrating results of simulation verification of the transmission-axis transmittance Tp of the polarizing plate 1A having the structure illustrated in FIG. 4 and the polarizing plate 100 having the structure illustrated in FIG. 8. In FIG. 9, the horizontal axis represents the wavelength λ (nm), and the vertical axis represents the transmission-axis transmittance Tp (%). In addition, in FIG. 9, the polarizing plate having a trapezoidal pedestal illustrated by a solid line indicates the polarizing plate 1A of FIG. 4, and the polarizing plate having no pedestal illustrated by a broken line indicates the polarizing plate 100 of FIG. 8. As illustrated in FIG. 9, it was confirmed that, the trapezoidal pedestal is provided, so that the transmission-axis transmittance Tp is improved over the range of from light in the blue band (λ=430 to 510 nm) to the light in the green band (wavelength λ=520 to 590 nm).

Example 4

Figure 10:
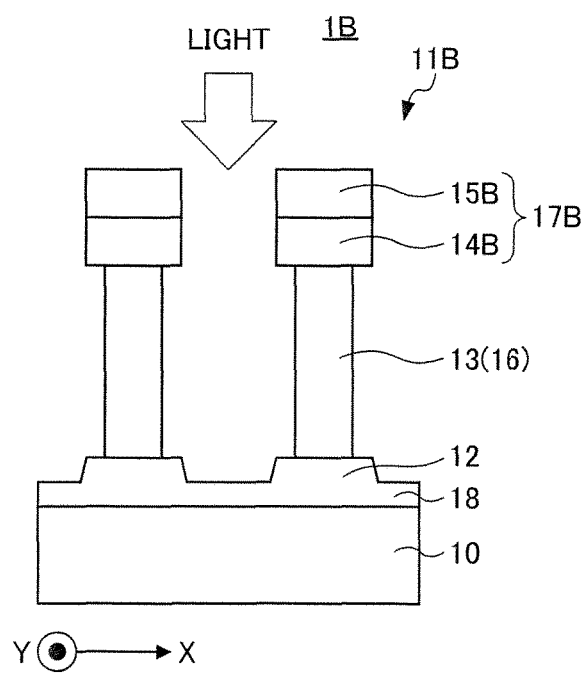
FIG. 10 is a schematic cross-sectional view illustrating a polarizing plate having a rectangular grid tip.

FIG. 10 is a schematic cross-sectional view illustrating a polarizing plate 1B having a rectangular grid tip 17B. The polarizing plate 1B according to Example 4 has the same structure as that of the polarizing plate 1 having the structure illustrated in FIG. 1, except that the grid tip 17B is configured with a dielectric layer 14B and an absorption layer 15B, each of which has not a tapered shape but a rectangular shape. In FIG. 10, the components common to the polarizing plate 1 are denoted by the same reference numerals. The polarizing plate 1B corresponds to the polarizing plate 1 illustrated in FIG. 1 where the inclination angle θ of the side face of the grid tip of the polarizing plate 1 is 90°. In this example, with respect to the polarizing plate 1 having the structure illustrated in FIG. 1, simulation of changing the inclination angle θ and variously changing the ratio of the height a of the grid tip to the grid width b was performed. In addition, in this example, simulation of the transmission-axis transmittance Tp and the absorption-axis reflectance Rs was performed. Herein, the absorption-axis reflectance Rs denotes reflectance of polarized light (TE wave) in the absorption axis direction (Y-axis direction) of the polarizing plate. In addition, in this example, simulation was performed on polarizing plate designed to be optimized for light in the green band (wavelength λ=520 to 590 nm (predetermined wavelength)).

Figure 11:
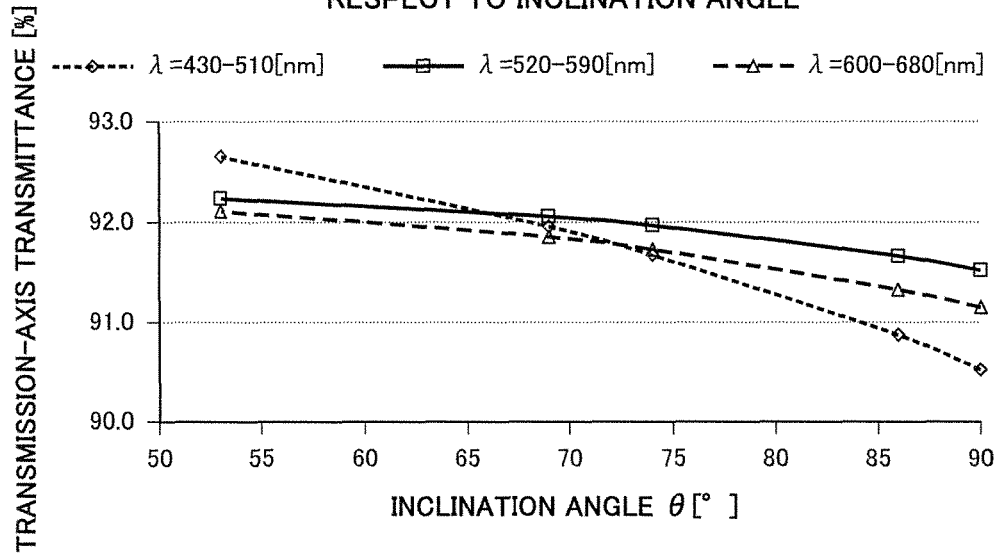
FIG. 11 is a graph illustrating results of simulation verification of the relationship between the inclination angle θ of the grid tip and the transmission-axis transmittance Tp in a case where the ratio of the height a of the grid tip to the grid width b is a:b=6:9 in the polarizing plate having the structure illustrated in FIG. 1.

FIG. 11 is a graph illustrating results of simulation verification of the relationship between the inclination angle θ of the grid tip and the transmission-axis transmittance Tp in a case where the ratio of the height a of the grid tip to the grid width b is a:b=6:9 in the polarizing plate having the structure illustrated in FIG. 1. In FIG. 11, the horizontal axis represents the inclination angle θ (°), and the vertical axis represents the transmission-axis transmittance Tp (%). In addition, in FIG. 11, a broken line illustrates the light in the blue band (wavelength λ=430 to 510 nm), a solid line illustrates the light in the green band (wavelength λ=520 to 590 nm), and a one-dot dashed line illustrates the light in the red band (wavelength λ=600 to 680 nm).

Herein, if the transmission-axis transmittance Tp is high, it denotes that desired light with high intensity is transmitted through the polarizing plate. As illustrated in FIG. 11, as the inclination angle θ is inclined from 90° (in other words, as it deviates from right to left in the graph), for any one of the blue band (wavelength λ=430 to 510 nm), the green band (wavelength λ=520 to 590 nm), and the red band (wavelength λ=600 to 680 nm), the transmission-axis transmittance Tp is increased. Particularly, it can be understood that the transmission-axis transmittance Tp for the blue band is greatly increased.

Figure 12:
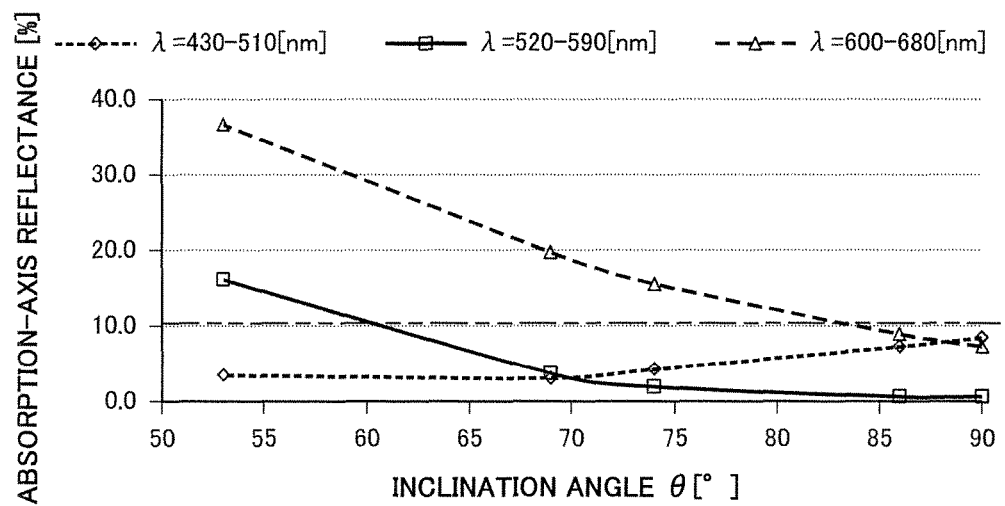
FIG. 12 is a graph illustrating results of simulation verification of the relationship between the inclination angle θ of the grid tip and the absorption-axis reflectance Rs in a case where the ratio of the height a of the grid tip to the grid width b is a:b=6:9 in the polarizing plate having the structure illustrated in FIG. 1.
Figure 13:
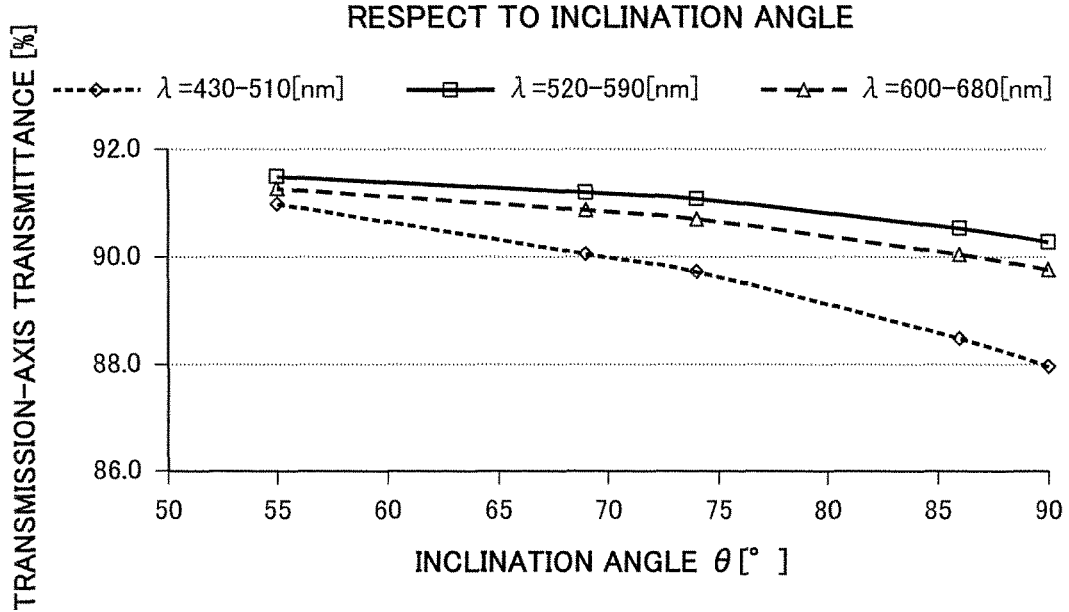
FIG. 13 is a graph illustrating results of simulation verification of the relationship between the inclination angle θ of the grid tip and the transmission-axis transmittance Tp in a case where the ratio of the height a of the grid tip to the grid width b is a:b=8:11 in the polarizing plate having the structure illustrated in FIG. 1.
Figure 14:
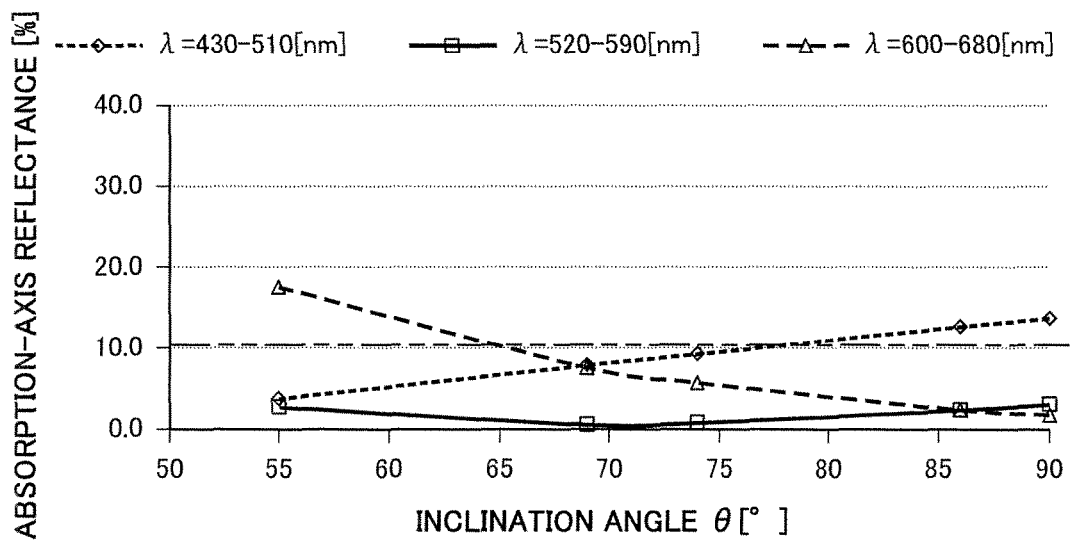
FIG. 14 is a graph illustrating results of simulation verification of the relationship between the inclination angle θ of the grid tip and the absorption-axis reflectance Rs in a case where the ratio of the height a of the grid tip to the grid width b is a:b=8:11 in the polarizing plate having the structure illustrated in FIG. 1.

FIG. 12 is a graph illustrating results of simulation verification of the relationship between the inclination angle θ of the grid tip and the absorption-axis reflectance Rs in a case where the ratio of the height a of the grid tip to the grid width b is a:b=6:9 in the polarizing plate having the structure illustrated in FIG. 1. In FIG. 12, the horizontal axis represents the inclination angle θ (°), and the vertical axis represents the absorption-axis reflectance Rs (%). As illustrated in FIG. 12, when the absorption-axis reflectance Rs is increased, it denotes that the polarized light (TE wave) in the direction of the absorption axis reflected by the polarizing plate becomes strong. Since such reflected light lowers the extinction ratio, it is preferable that the absorption-axis reflectance Rs is low. For many applications of liquid crystal projectors, the absorption-axis reflectance Rs is required to be less than 10%.

According to FIG. 12, as the inclination angle θ is decreased, the absorption-axis reflectance Rs of the green band which is the design wavelength of the polarizing plate in the simulation is increased. When the inclination angle θ becomes smaller than 61°, the absorption-axis reflectance Rs exceeds 10%. Therefore, the value of the inclination angle θ allowed for the application of a liquid crystal projector is 61°≤θ<90°. The angle is called a device characteristic inclination angle. In addition, when the inclination of the side face of the grid tip is increased (the inclination angle θ is decreased), the absorption-axis reflectance Rs is increased. It is considered that this is because the sizes of the dielectric layer and the absorption layer in the direction along the transparent substrate are decreased, so that the absorption effect of the reflected light (TE wave) by these is deteriorated.

FIGS. 13 and 14, FIGS. 15 and 16, FIGS. 17 and 18, and FIGS. 19 and 20 are graphs illustrating the transmission-axis transmittance Tp and absorption-axis reflectance Rs of the polarizing plate with respect to the inclination angle θ of the grid tip in a case where the ratio of the height a of the grid tip to the grid width b is a:b=8:11, in a case where the ratio of the height a of the grid tip to the grid width b is a:b=8:9, in a case where the ratio of the height a of the grid tip to the grid width b is a:b=10:9, and in a case where the ratio of the height a of the grid tip to the grid width b is a:b=8:7, respectively.

It was recognized that, irrespective of the ratio of the height a of the grid tip to the grid width b, as the inclination of the side face of the grid tip is increased (as the inclination angle θ is decreased), the transmission-axis transmittance Tp is improved in any one of the blue, green, and red bands. In addition, in any cases, it was found that the increase of the transmission-axis transmittance Tp of the blue band is larger than the other bands.

Figure 15:
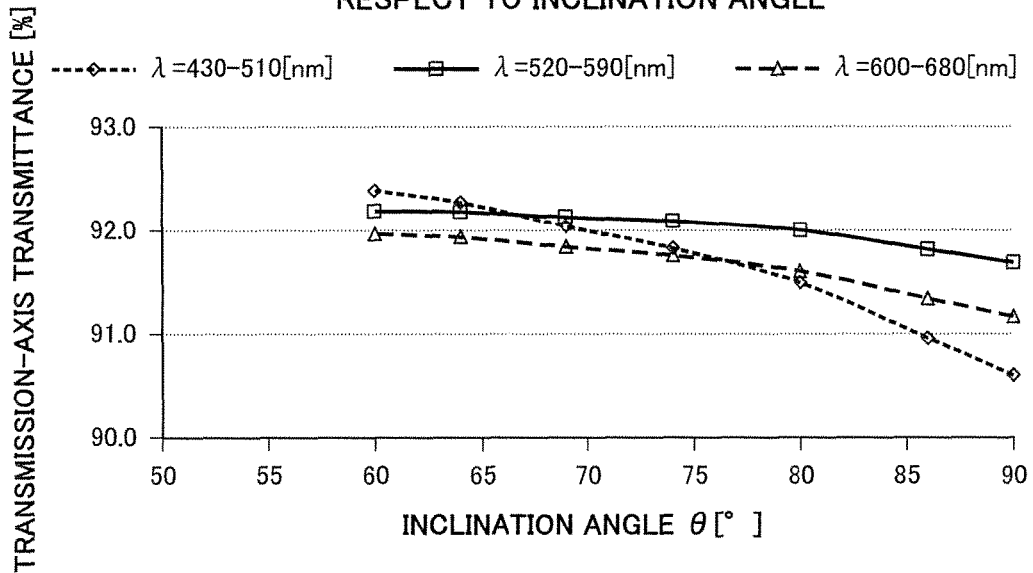
FIG. 15 is a graph illustrating results of simulation verification of the relationship between the inclination angle θ of the grid tip and the transmission-axis transmittance Tp in a case where the ratio of the height a of the grid tip to the grid width b is a:b=8:9 in the polarizing plate having the structure illustrated in FIG. 1.
Figure 16:
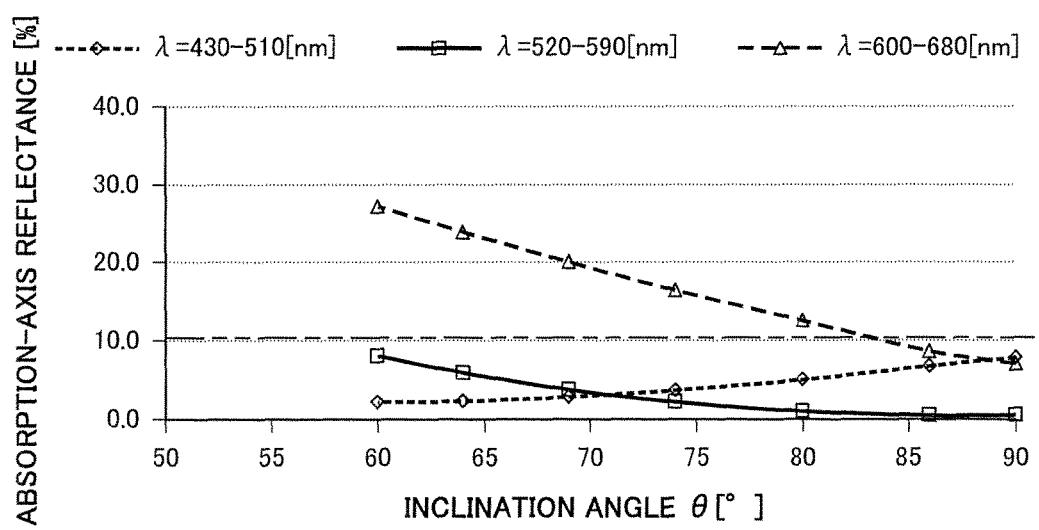
FIG. 16 is a graph illustrating results of simulation verification of the relationship between the inclination angle θ of the grid tip and the absorption-axis reflectance Rs in a case where the ratio of the height a of the grid tip to the grid width b is a:b=8:9 in the polarizing plate having the structure illustrated in FIG. 1.
Figure 17:
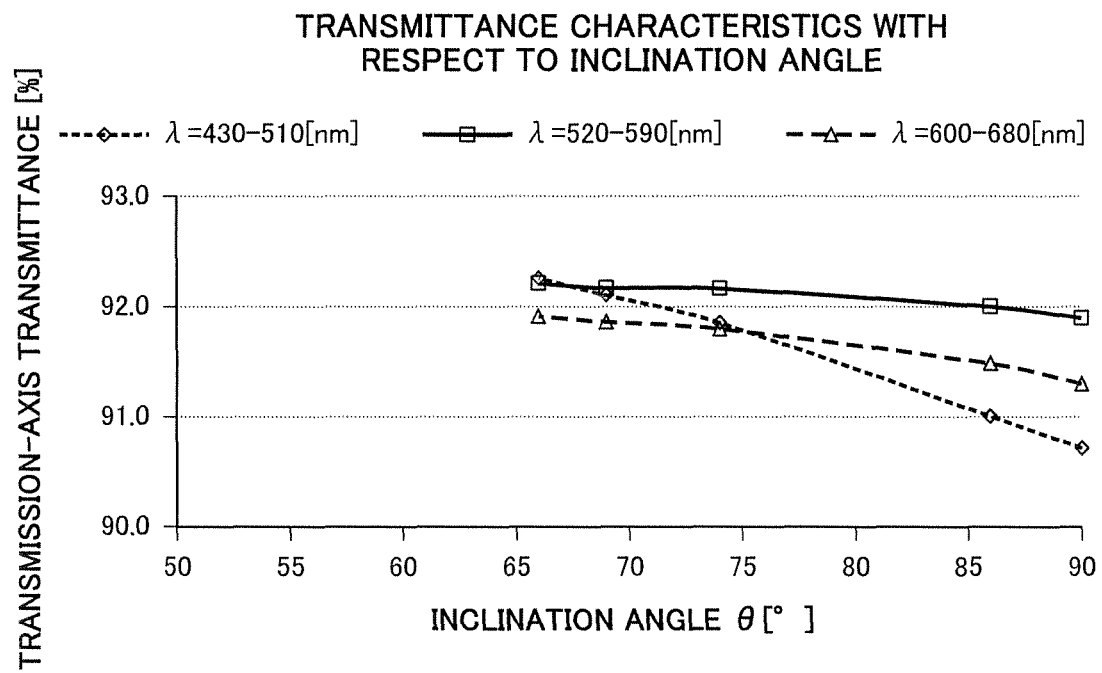
FIG. 17 is a graph illustrating results of simulation verification of the relationship between the inclination angle θ of the grid tip and the transmission-axis transmittance Tp in a case where the ratio of the height a of the grid tip to the grid width b is a:b=10:9 in the polarizing plate having the structure illustrated in FIG. 1.
Figure 18:
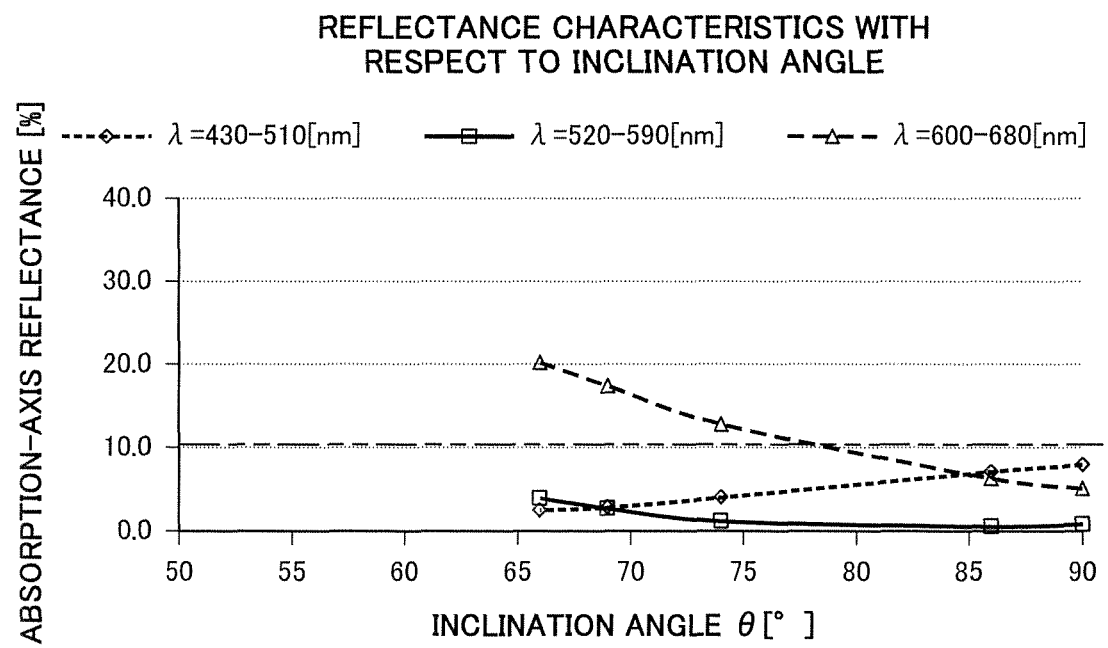
FIG. 18 is a graph illustrating results of simulation verification of the relationship between the inclination angle θ of the grid tip and the absorption-axis reflectance Rs in a case where the ratio of the height a of the grid tip to the grid width b is a:b=10:9 in the polarizing plate having the structure illustrated in FIG. 1.
Figure 19:
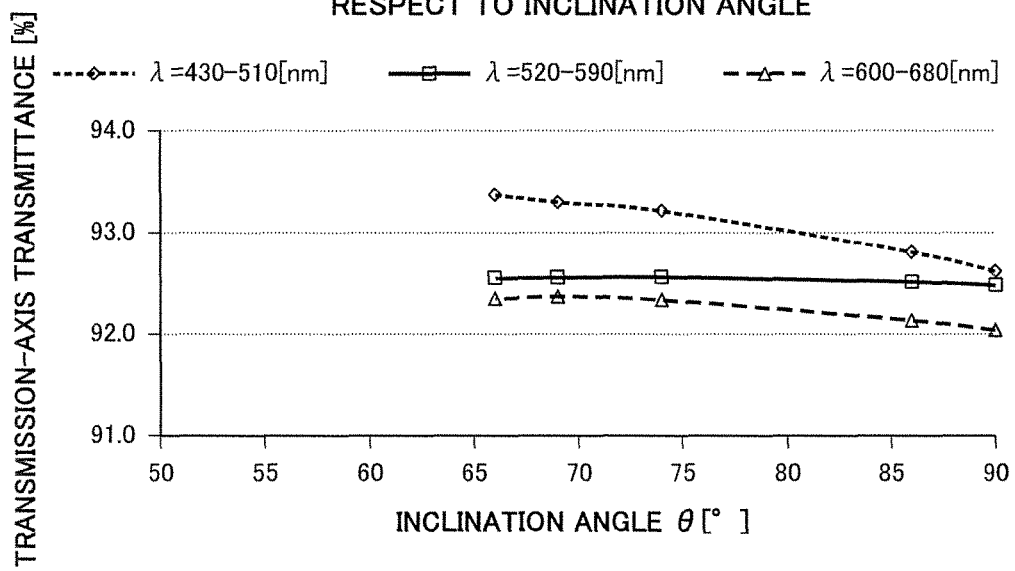
FIG. 19 is a graph illustrating results of simulation verification of the relationship between the inclination angle θ of the grid tip and the transmission-axis transmittance Tp in a case where the ratio of the height a of the grid tip to the grid width b is a:b=8:7 in the polarizing plate having the structure illustrated in FIG. 1.
Figure 20:
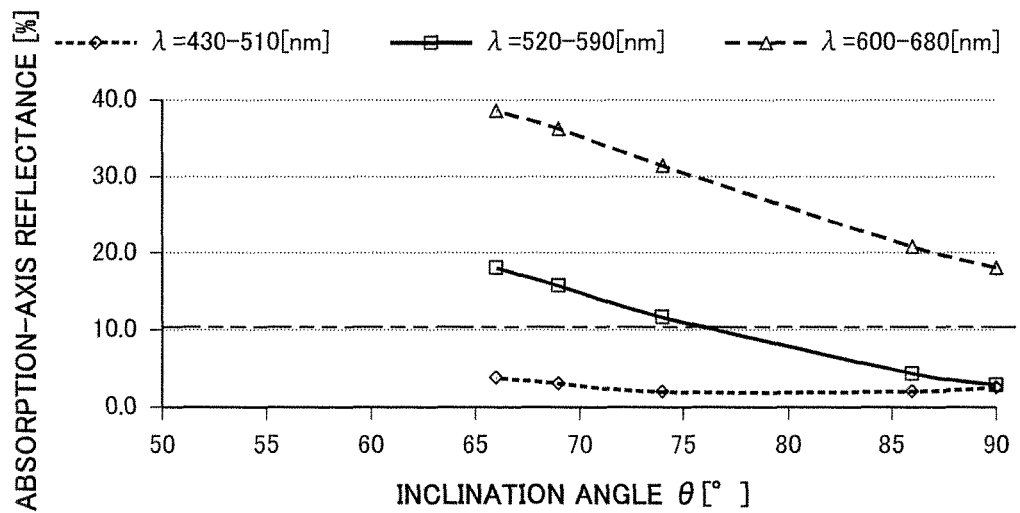
FIG. 20 is a graph illustrating results of simulation verification of the relationship between the inclination angle θ of the grid tip and the absorption-axis reflectance Rs in a case where the ratio of the height a of the grid tip to the grid width b is a:b=8:7 in the polarizing plate having the structure illustrated in FIG. 1.

On the other hand, in a case where the ratio of the height a of the grid tip to the grid width b is a:b=8:7, as illustrated in FIG. 20, when θ<77°, the absorption-axis reflectance Rs of light in the green band exceeds 10%. Therefore, in this case, the device characteristic inclination angle is 77°≤θ<90°. In addition, in a case where the ratio of the height a of the grid tip to the grid width b is a:b=8:9, as illustrated in FIG. 15, the effect of improvement of the characteristics of the transmission-axis transmittance Tp by inclining the side face of the grid tip is high, and the inclination angle θ can be 60°≤θ<90°.

Herein, based on the simulation results of FIGS. 11 to 20, the range of the inclination angle θ of the grid tip with respect to the ratio of the height a of the grid tip to the grid width b is listed in Table 2.

In Table 2, the simulation inclination angle θ is in a range of the inclination angle on which the simulation was performed, and as described above, the range is θo≤θ<90° (θo=arctan(2a/b)). In FIGS. 11 to 20, when the ratio of the height a of the shape of the grid tip to the grid width b is indicated by a/b, it was confirmed that, even in any range included in 2/3≤a/b≤8/7, the transmission-axis transmittance of the light in each wavelength band is increased in a range of the inclination angle θ. In addition, as described above, the device characteristic inclination angle is an inclination angle in such a range that the absorption-axis reflectance Rs does not exceed 10%. In a case where the polarizing plate is used for a liquid crystal projector or the like, it is preferable that the inclination angle θ satisfies this device characteristic inclination angle range.

Example 5

Figure 21:
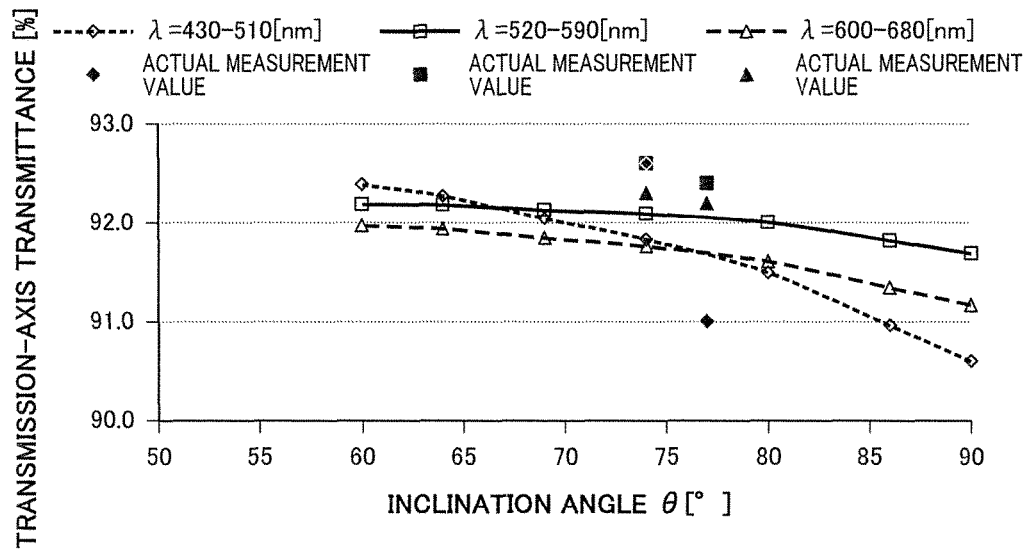
FIG. 21 is a graph illustrating comparison and verification results of actual measurement values and simulation results of the transmission-axis transmittance Tp with respect to the inclination angle θ of the side face of the grid tip in a case where the ratio of the height a of the grid tip to the grid width b is a:b=8:9 in the polarizing plate having the structure illustrated in FIG. 1.

Next, the polarizing plate having the wire grid structure illustrated in FIG. 1 was actually manufactured, and the obtained optical characteristics were compared with simulation results. FIG. 21 is a graph illustrating comparison and verification results of actual measurement values and simulation results of the transmission-axis transmittance Tp with respect to the inclination angle θ of the side face of the grid tip in a case where the ratio of the height a of the grid tip to the grid width b is 8:9.

In FIG. 21, blank points are the same as the simulation results illustrated in FIG. 15. Meanwhile, with respect to the cases where the average values of the inclination angle θ are 77° and 74°, the actual measurement values are indicated by the black points. Herein, in a case where the average value of the inclination angle θ is 74°, the actual measurement value of the blue band (wavelength λ=430 to 510 nm) and the actual measurement value of the green band (wavelength λ=520 to 590 nm) become overlapping points in the vicinity of 92.6%. The average values of the inclination angles 8 are used because there is variation in inclination angle of the side face of the grid tip of the actually manufactured polarizing plate.

As can be seen from FIG. 21, in the actual measurement result, the transmission-axis transmittance Tp in the entire band is higher in a case where the average value of the inclination angle θ is 74° than in a case where the average value of the inclination angle θ is 77°. Particularly, in the blue band, the transmission-axis transmittance Tp is greatly improved. In this manner, it was confirmed that the transmission-axis transmittance Tp is improved by further inclining the side face of the grid tip (by decreasing the inclination angle θ).

Next, FIGS. 22 to 25 are graphs illustrating actual measurement values of the transmission-axis transmittance Tp, the absorption-axis transmittance Ts, the transmission-axis reflectance Rp, and the absorption-axis reflectance Rs, respectively, for the two actually manufactured polarizing plates. Herein, the transmission-axis reflectance Rp denotes

TABLE 2

|  | a:b | | | | |
| --- | --- | --- | --- | --- | --- |
|  | 6:9 | 8:11 | 8:9 | 10:9 | 8:7 |
| Simulation inclination angle θ | 53° ≤ θ < 90° | 55° ≤ θ < 90° | 60° ≤ θ < 90° | 66° ≤ θ < 90° | 66° ≤ θ < 90° |
| Device characteristic inclination angle θ | 61° ≤ θ < 90° | 55° ≤ θ < 90° | 60° ≤ θ < 90° | 66° ≤ θ < 90° | 77° ≤ θ < 90° | the reflectance of polarized light (TM wave) in the transmission axis direction (X-axis direction) incident on the polarizing plate. In each of the graphs, the polarizing plate illustrated by a broken line has the inclination angle θ of the side face of the grid tip which is in a range of 80° to 84°, and the polarizing plate illustrated by a solid line has the inclination angle θ of the side face of the grid tip which is in a range of 76° to 80°. In addition, the ratio of the grid height a to the grid width b of the two polarizing plates is a value close to 2/3 and 8/11.

Figure 22:
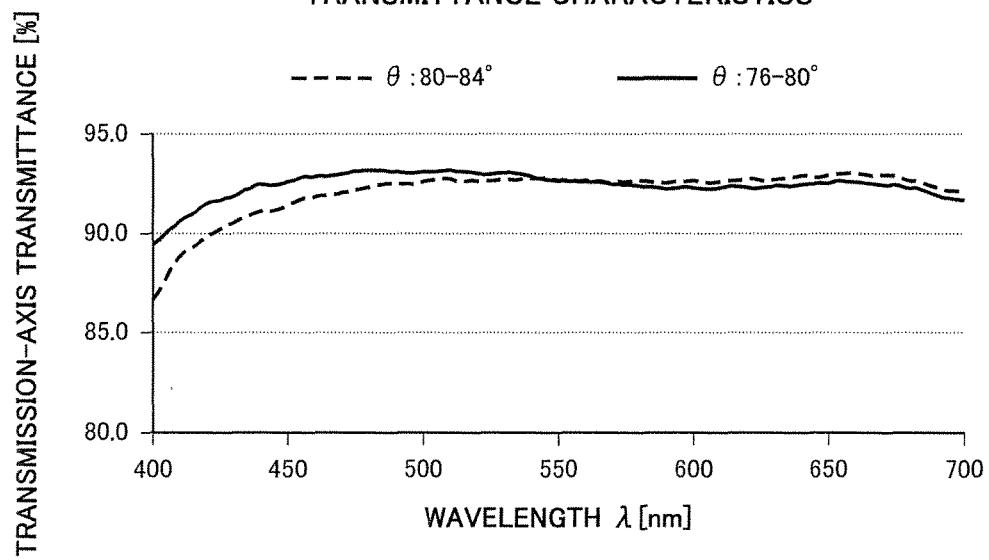
FIG. 22 is a graph illustrating actual measurement values of the transmission-axis transmittance Tp when the grid inclination angle θ is different in the polarizing plate having the structure illustrated in FIG. 1.

It is recognized that, as illustrated in FIG. 22, when the inclination angle θ of the side face of the grid tip is decreased, the transmission-axis transmittance Tp representing the transmittance of the TM wave of the polarizing plate is greatly improved particularly in the blue band (wavelength λ=430 to 510 nm). In addition, in a case where the value of the inclination angle θ is 76° to 80°, in the visible light region including the blue band with a wavelength of 430 nm or more, the transmission-axis transmittance Tp is about 92% to 93% which is substantially constant irrespective of wavelength, and sufficient improvement in the transmittance is obtained. Therefore, it is considered that, in a case where the inclination angle θ is 80° or less, the effect of improving the transmittance according to the present invention is large. In addition, in the simulation examples illustrated in FIGS. 11, 15, and 17, if the inclination angle θ is 80° or less, the differences among the transmission-axis transmittances Tp of the blue band, the green band, and the red band become small values in a range of about 0.5 to 1%. For this reason, since light is uniformly transmitted for each wavelength band of the light transmitted through the polarizing plate, the change in color is small.

Figure 23:
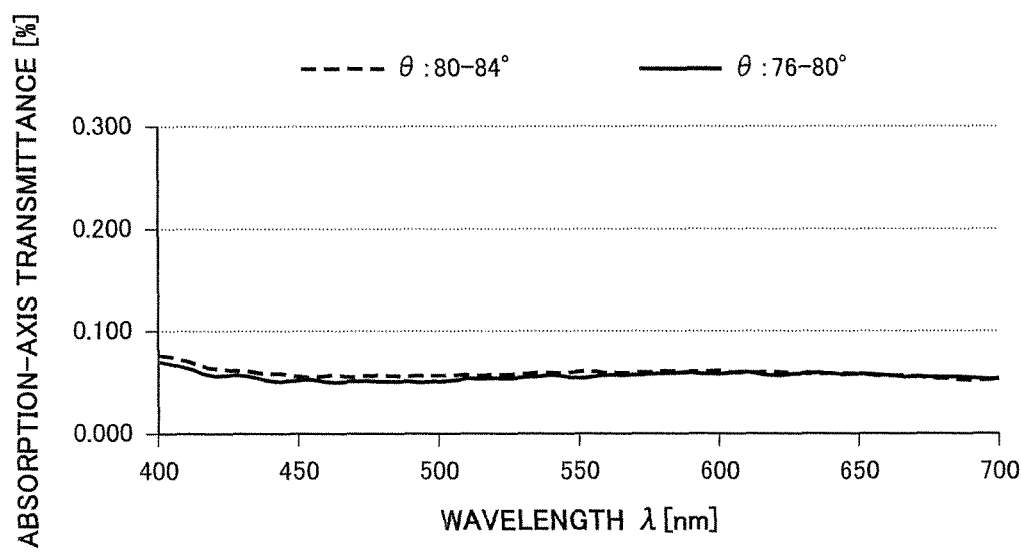
FIG. 23 is a graph illustrating actual measurement values of the absorption-axis transmittance Ts when the grid inclination angle θ is different in the polarizing plate having the structure illustrated in FIG. 1.
Figure 24:
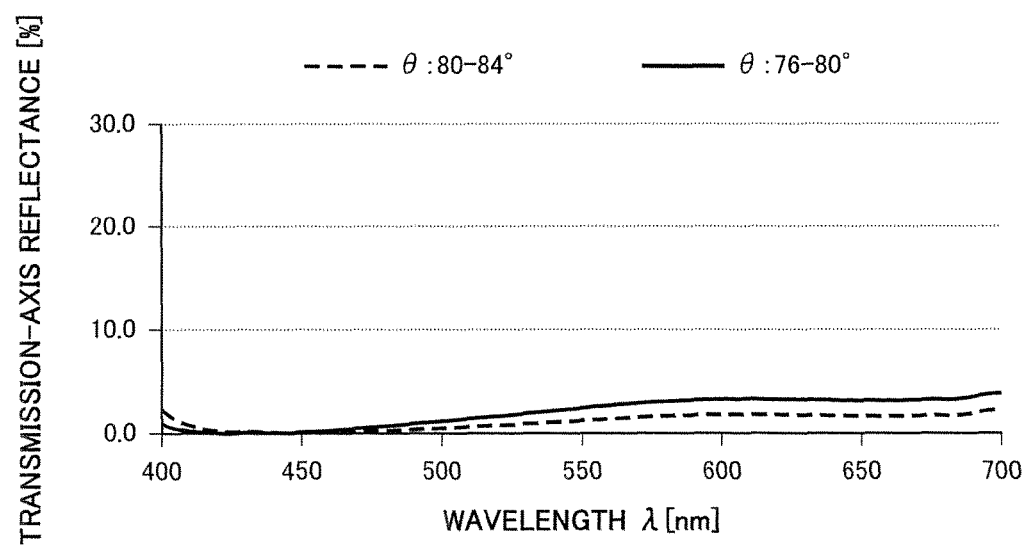
FIG. 24 is a graph illustrating actual measurement values of the transmission-axis reflectance Rp when the grid inclination angle θ is different in the polarizing plate having the structure illustrated in FIG. 1.
Figure 25:
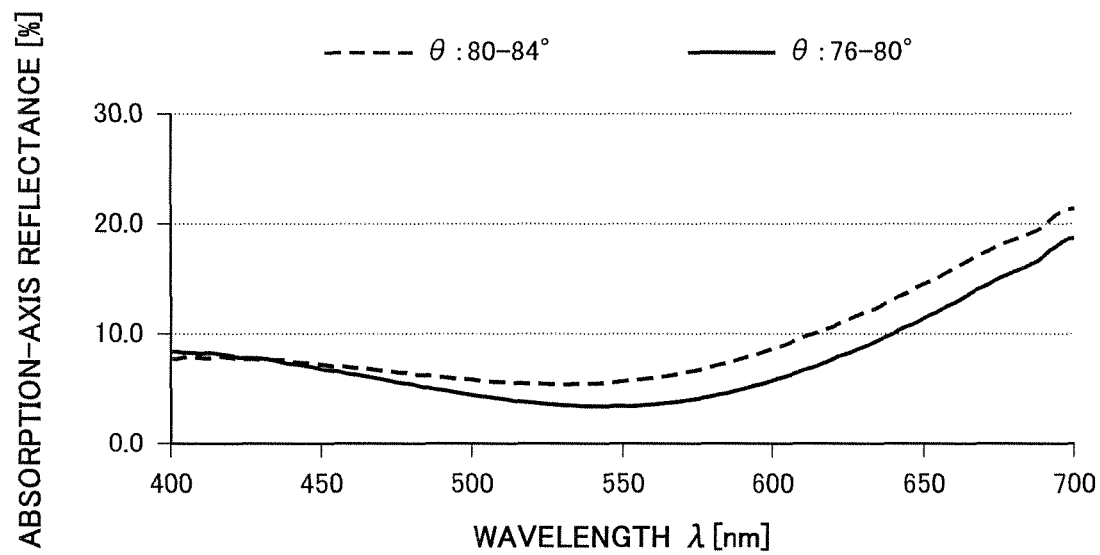
FIG. 25 is a graph illustrating actual measurement values of absorption-axis reflectance Rs when the grid inclination angle θ is different in the polarizing plate having the structure illustrated in FIG. 1.

Meanwhile, the absorption-axis transmittance Ts representing the transmittance of the TE wave illustrated in FIG. 23 and the transmission-axis reflectance Rp representing the reflectance of the TM wave illustrated in FIG. 24 are hardly affected even though the inclination angle θ is changed. In addition, with respect to the absorption-axis reflectance Rs representing the reflectance of the TE wave illustrated in FIG. 25, the reflectance tends to be decreased over the entire visible light.

From the results described above, it can be said that, in the grid-shaped protrusion having a wire grid structure, by forming the trapezoidal pedestal on the transparent substrate, controlling the width of the reflection layer to be smaller than the width of the pedestal and the width of the dielectric layer, and controlling the inclination angle of the side surface of the grid tip, the effect of improving the transmittance in the direction of the transmission axis, particularly, the transmission-axis transmittance for light on the short wavelength side including the blue band in the visible light region is large.

In addition, although the basic structure is the same as that of the related art, desired light transmission characteristics corresponding to a narrow grid width can be obtained without narrowing the grid width itself, and thus, a collapse of a mask pattern in photolithography or the like by forming a thin grid or a collapse of a grid due to dry etching or the like do not easily occur. Therefore, it is possible to facilitate manufacturing of a polarizing plate, to suppress variations in manufacturing, and to maintain reliability as a polarizing plate.

EXPLANATION OF REFERENCE NUMERALS 1, 1A, 1B polarizing plate
10 transparent substrate
11, 11A, 11B grid-shaped protrusion
12 pedestal
13, 13A reflection layer
14, 14B dielectric layer
15, 15B absorption layer
16, 16A grid leg
17, 17B grid tip
18 underlying layer
P pitch of grid-shaped protrusion
a height of grid tip
b grid width
c width of reflection layer
θ inclination angle

What is claimed is:

1. A polarizing plate having a wire grid structure, the polarizing plate comprising:
    a transparent substrate; and
    grid-shaped protrusions that are arranged on the transparent substrate at a pitch shorter than a wavelength of light in a use band and extend in a predetermined direction,
    wherein the grid-shaped protrusion includes, in order from the transparent substrate side, a pedestal, a reflection layer, a dielectric layer, and an absorption layer, and
    the pedestal has a trapezoidal shape when viewed from the predetermined direction.

2. The polarizing plate according to claim 1, wherein a minimum width of the pedestal is equal to or larger than a width of the reflection layer.

3. The polarizing plate according to claim 1, wherein the pedestal is configured with an Si oxide that is transparent to the wavelength of the light in the use band.

4. The polarizing plate according to claim 1, wherein a grid tip formed at a tip of the grid-shaped protrusion has a tapered shape where a side face is inclined in such a direction that a width thereof is decreased toward a tip side when viewed from the predetermined direction.

5. The polarizing plate according to claim 4, wherein the grid tip is configured with the dielectric layer and the absorption layer,
    a maximum width of the grid tip is 35 to 45 nm, and
    a width of the reflection layer is 52 to 72% of the maximum width of the grid tip.

6. The polarizing plate according to claim 4, wherein, when an inclination angle of the side face of the grid tip with respect to the transparent substrate is denoted by θ,
    a height of the grid tip when viewed from the predetermined direction is denoted by a, a maximum width of the grid tip is denoted by b, and $\theta_0=\arctan(2a/b)$,
    $2/3 \leq a/b \leq 8/7$ is satisfied, and $\theta_0 \leq \theta < 90°$ is satisfied, and
    the inclination angle θ is selected from an angle range in which reflectance of light with a predetermined wavelength in a visible light region in an absorption-axis direction is 10% or less.

7. The polarizing plate according to claim 4, wherein an inclination angle θ is defined as an inclination angle of a tangent line of the side face of the grid tip at a center position in a height direction of the grid tip when viewed from the predetermined direction, and an angle range thereof is $\theta \leq 80°$.

8. The polarizing plate according to claim 1, wherein the transparent substrate is transparent to the wavelength of the light in the use band and is configured with glass, quartz or sapphire.

9. The polarizing plate according to claim 1, wherein the reflection layer is configured with aluminum or an aluminum alloy.

10. The polarizing plate according to claim 1, wherein the dielectric layer is configured with an Si oxide.

11. The polarizing plate according to claim 1, wherein the absorption layer is configured to include Fe or Ta and to include Si.

12. The polarizing plate according to claim 1, wherein a surface of the polarizing plate on which light is incident is covered with a protective film made of a dielectric material.

13. The polarizing plate according to claim 1, wherein a surface of the polarizing plate on which light is incident is covered with an organic water-repellent film.

14. An optical apparatus comprising the polarizing plate according to claim 1.

15. A method of manufacturing a polarizing plate having a wire grid structure, the method comprising:
- an underlying layer forming step of forming an underlying layer on a transparent substrate;
- a reflection layer forming step of forming a reflection layer on the underlying layer;
- a dielectric layer forming step of forming a dielectric layer on the reflection layer;
- an absorption layer forming step of forming an absorption layer on the dielectric layer; and
- an etching step of selectively etching a formed stack to form grid-shaped protrusions that are arranged on the transparent substrate at a pitch shorter than a wavelength of light in a use band,
- wherein, in the etching step, the underlying layer is etched to form a pedestal having a trapezoidal shape when viewed from an extending direction of the grid-shaped protrusions.

* * * * *